US012799561B2

(12) United States Patent
Watanabe et al.

(10) Patent No.: US 12,799,561 B2
(45) Date of Patent: Nov. 17, 2026

(54) METHOD FOR CONCENTRATING VALUABLE METAL CONTAINED IN LITHIUM ION SECONDARY BATTERY

(71) Applicant: DOWA ECO-SYSTEM CO., LTD., Tokyo (JP)

(72) Inventors: Ryoei Watanabe, Tokyo (JP); Yoshihiro Honma, Tokyo (JP); Chihiro Nishikawa, Tokyo (JP); Masataka Yamashita, Tokyo (JP); Jiahao Liu, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 576 days.

(21) Appl. No.: 17/908,740

(22) PCT Filed: Mar. 1, 2021

(86) PCT No.: PCT/JP2021/007600
§ 371 (c)(1),
(2) Date: Sep. 1, 2022

(87) PCT Pub. No.: WO2021/177200
PCT Pub. Date: Sep. 10, 2021

(65) Prior Publication Data
US 2023/0119544 A1 Apr. 20, 2023

(30) Foreign Application Priority Data
Mar. 6, 2020 (JP) ................................ 2020-038373
Feb. 26, 2021 (JP) ................................ 2021-029400

(51) Int. Cl.
*C22B 23/02* (2006.01)
*B09B 3/35* (2022.01)
(Continued)

(52) U.S. Cl.
CPC ................ *C22B 23/02* (2013.01); *B09B 3/35* (2022.01); *C22B 1/005* (2013.01); *H01M 10/54* (2013.01)

(58) Field of Classification Search
CPC ......... C22B 23/02; C22B 1/005; C22B 7/005; B09B 3/30; B09B 3/40; B09B 2101/16;
(Continued)

(56) References Cited

U.S. PATENT DOCUMENTS 9,359,659 B2 * 6/2016 Fujita .................. C22B 23/0407
2001/0054331 A1 * 12/2001 Yasuda ................. C22B 23/026
75/406
(Continued)

FOREIGN PATENT DOCUMENTS

JP 6-322452 A 11/1994
JP 7-207349 A 8/1995
(Continued)

OTHER PUBLICATIONS

Zheng, Ying, et al. "Lithium nickel cobalt manganese oxide recovery via spray pyrolysis directly from the leachate of spent cathode scraps." ACS Applied Energy Materials 2.9 (2019): 6952-6959. (Year: 2019).*
(Continued)

*Primary Examiner* — Keith D. Hendricks
*Assistant Examiner* — Moriah S. Smoot
(74) *Attorney, Agent, or Firm* — Greenblum & Bernstein, P.L.C.

(57) ABSTRACT

Provided is a method for concentrating a valuable metal contained in a lithium ion secondary battery, for processing a lithium ion secondary battery containing at least one element selected from the group consisting of cobalt and nickel, or a positive electrode material of the lithium ion secondary battery, to concentrate a valuable metal contain-
(Continued)

ing either or both of cobalt and nickel. The method includes a thermal treatment step of thermally treating the lithium ion secondary battery or the positive electrode material thereof, to form a granular aggregate containing at least one valuable metal selected from the group consisting of cobalt and nickel.

9 Claims, 8 Drawing Sheets

(51) Int. Cl.
*C22B 1/00* (2006.01)
*H01M 10/54* (2006.01)

(58) Field of Classification Search
CPC .... B09B 3/35; B09B 5/00; B07C 5/34; B03C 1/10; B03C 2201/18; B03C 1/30; B03C 1/00; Y02E 60/10; Y02P 10/20; Y02W 30/84; Y02W 30/20; Y02W 30/52; B07B 1/00; H01M 50/119; H01M 10/54
See application file for complete search history.

(56) References Cited

U.S. PATENT DOCUMENTS

| | | | | |
|---|---|---|---|---|
| 2019/0084839 | A1 * | 3/2019 | Ito | C01G 45/01 |
| 2020/0044295 | A1 * | 2/2020 | Arakawa | B09B 5/00 |

FOREIGN PATENT DOCUMENTS

| | | | | | |
|---|---|---|---|---|---|
| JP | 10-74539 | A | | 3/1998 | |
| JP | 2000-348782 | A | | 12/2000 | |
| JP | 2011094206 | A | * | 5/2011 | |
| JP | 5569457 | B2 | * | 8/2014 | |
| JP | 2014199774 | A | * | 10/2014 | |
| JP | 5706457 | B2 | | 4/2015 | |
| JP | 2015178642 | A | * | 10/2015 | |
| JP | 2016089209 | A | * | 5/2016 | |
| JP | 2016186113 | A | * | 10/2016 | |
| JP | 2017-37807 | A | | 2/2017 | |
| JP | 2019-169309 | A | | 10/2019 | |
| JP | 7341830 | B2 | * | 9/2023 | |
| WO | 2012/169073 | A1 | | 12/2012 | |
| WO | WO-2015011883 | A1 | * | 1/2015 | H01M 4/38 |
| WO | WO-2018233383 | A1 | * | 12/2018 | B03B 7/00 |

OTHER PUBLICATIONS

JP2016186113A Trans (English Language Translation) (Year: 2016).*
JP2015178642A Trans (English Language Translation) (Year: 2015).*
WO2015011883A1 Trans (English Language Translation) (Year: 2015).*
JP-2011094206-A Trans (English Lanugage Transaltion) (Year: 2011).*
JP 5569457 B2 Trans (English Language Translation) (Year: 2014).*
WO 2018233383 A1 Trans (English Language Translation) (Year: 2018).*
International Search Report and Written Opinion of the International Searching Authority issued in International Patent Application No. PCT/JP2021/007600, dated Apr. 27, 2021, along with an English translation thereof.
Notice of Reasons for Refusal (Office Action) issued in corresponding Japanese Patent Appl. No. 2021-029400, dated Apr. 20, 2021, along with an English translation thereof.
Decision of Refusal (Office Action) issued in corresponding Japanese Patent Appl. No. 2021-029400, dated Jul. 13, 2021, along with an English translation thereof.
Extended European Search Report that issued in corresponding European Patent Application No. 21764793.2 dated mailed Mar. 13, 2024.

* cited by examiner

METHOD FOR CONCENTRATING VALUABLE METAL CONTAINED IN LITHIUM ION SECONDARY BATTERY

TECHNICAL FIELD

The present invention relates to a method for concentrating a valuable metal contained in a lithium ion secondary battery.

BACKGROUND ART

Lithium ion secondary batteries have a lighter weight, a higher capacity, and a higher electromotive force than those of existing lead-acid batteries and NiCd secondary batteries, and are used as secondary batteries of, for example, personal computers, electric vehicles, and portable devices. For example, valuable metals such as cobalt and nickel are used in the positive electrodes of lithium ion secondary batteries in the form of, for example, lithium cobaltate ($LiCoO_2$) and a ternary system positive electrode active substance ($LiNi_xCo_yMn_zO_2$ (x+y+z=1)).

Lithium ion secondary batteries are expected to continue to become more widespread in use. Therefore, in terms of resource recycling, it is desirable to concentrate valuable metals such as cobalt and nickel from defective products generated in the production process or from lithium ion secondary batteries discarded due to, for example, expired life of the batteries and of the devices in which they are used.

For example, a method proposed as a technique for recovering valuable metals from waste lithium ion secondary battery materials heats the waste secondary battery materials at from 300 °C through 500 °C in an oxygen-containing gas stream to separate, remove, and recover metal foils, and again heats the recovered product at from 500 °C through 650 °C in an oxygen-containing gas stream to remove combustible substances, to thereby recover the residues as metal compounds for positive electrode materials (see PTL 1). This method performs a two-stage thermal decomposition process. That is, the method suppresses decomposition of graphite contained in the electrode materials as much as possible until the electrode materials are peeled from metal foils at the first stage, and then decomposes graphite at the second stage after the metal foils are separated and removed, to thereby suppress as much as possible, a sintering phenomenon through which the metal compounds to be recovered increase in particle diameter.

Another proposed method heats lithium ion batteries enveloped in aluminum housings at a low-temperature condition of from 400 °C through 550 °C, and heats undersize battery powders obtained by pulverization and classification at a high-temperature condition of from 550 °C through 700 °C, to thereby effectively remove aluminum and transform valuable metals such as cobalt into a form suitable for magnetic sorting or flotation (see PTL 2).

However, the technique described in PTL 1 aims for re-using the recovered electrode materials as they are in the form of metal compounds for positive electrode materials. Hence, the technique is in no way focused on recovering nickel and cobalt in the form of metals.

The technique described in PTL 2 is targeted at batteries containing cobalt-based positive electrode materials such as lithium cobaltate, and aims for separating cobalt from mixtures with, for example, aluminum, lithium aluminate, copper, copper oxide, and carbon. Therefore, PTL 2 does not mention separating manganese from cobalt, nickel, and manganese-containing oxides such as a ternary system positive electrode material ($LiNi_xCo_yMn_zO_2$ (x+y+z=1)) by thermal treatment and physical sorting.

For example, a technique proposed as a technique for concentrating cobalt and nickel from lithium ion secondary batteries burns electrode materials in the presence of oxygen, and leaches the burned body into an inorganic acid, to thereby separate and concentrate cobalt, copper, and aluminum (for example, see PTL 3). This existing technique can separate copper by leaching cobalt and aluminum into an inorganic acid, and can also separate cobalt and aluminum from each other by adjusting pH of the inorganic acid.

For example, another proposed technique subjects a metal mixture aqueous solution containing a metal group A including lithium, manganese, nickel, and cobalt and a metal group B including copper, aluminum, and iron to a two-stage solvent extracting step, to thereby separate the metal group B and manganese from lithium, nickel, and cobalt (for example, see PTL 4).

For example, another proposed technique thermally decomposes waste lithium ion secondary batteries by superheated vapor of from 350 °C through 550 °C, and pulverizes and classifies the resultant, to thereby concentrate valuable metals contained in the positive electrode materials (for example, see PTL 5). This technique can thermally decompose organic substances contained in the lithium ion secondary batteries at low costs while suppressing oxidization of metals and generation of dioxins, and can also concentrate valuable metals contained in the positive electrode materials without melting aluminum (having a melting point of 660 °C) contained in the housings and positive electrode current collectors.

However, the technique described in PTL 3 has a problem that, for example, troublesome steps such as filtration of the inorganic acid and adjustment of pH are necessary.

The technique described in PTL 4 has a problem that the costs of extracting agents and the costs of equipment installation are very high because the technique employs solvent extraction in order to separate manganese from cobalt, nickel, and lithium.

The technique described in PTL 5 can separate, for example, aluminum and copper at high concentration rates, but fails to purify cobalt and nickel as metals and results in obtaining concentrates of metals such as lithium, cobalt, nickel, and manganese in the form of mixture compounds.

CITATION LIST

Patent Literature

PTL 1: Japanese Patent Application Laid-Open (JP-A) No. 2000-348782

PTL 2: JP-A No. 2017-37807

PTL 3: JP-A No. 2019-169309

PTL 4: Japanese Patent (JP-B) No. 5706457

PTL 5: International Publication No. WO 2012/169073

SUMMARY OF INVENTION

Technical Problem

The present invention has an object to provide a method for concentrating valuable metals contained in a lithium ion secondary battery, the method being targeted at used lithium ion secondary batteries, or positive electrode materials of used lithium ion secondary batteries, or scraps from their production process, the method being able to easily obtain metal moieties in which cobalt and nickel are concentrated and to facilitate separation of not only cobalt and nickel but also manganese from other battery constituting components, particularly positive electrode active substances such as composite oxides containing cobalt, nickel, and manganese.

Solution to Problem

As a result of conducting studies in order to solve the problems described above, the present inventors have found that, where cobalt and nickel serving as positive electrode active substances contained in lithium ion secondary batteries are present in the form of oxides containing cobalt, nickel, manganese, and lithium, a thermal treatment performed under specific conditions based on a thermodynamic theoretical calculation can transform cobalt and nickel in the oxides into metals while maintaining, for example, manganese unchanged from the form of oxides, making it possible to efficiently obtain metal moieties in which the concentrations of cobalt and nickel are high (or cobalt and nickel are concentrated).

The present invention is based on the present inventors' finding described above, and means for solving the above problems are as follows.

<1> A method for concentrating a valuable metal contained in a lithium ion secondary battery, for processing a lithium ion secondary battery or a positive electrode material of the lithium ion secondary battery, the lithium ion secondary battery or the positive electrode material containing at least one element selected from the group consisting of cobalt and nickel, to concentrate a valuable metal containing either or both of cobalt and nickel, the method including:

a thermal treatment step of thermally treating the lithium ion secondary battery or the positive electrode material thereof, to form a granular aggregate containing at least one valuable metal selected from the group consisting of cobalt and nickel.

<2> The method for concentrating a valuable metal contained in a lithium ion secondary battery according to <1>, wherein in the thermal treatment step, the lithium ion secondary battery or the positive electrode material thereof is thermally treated in a reducing atmosphere or an inert atmosphere.

<3> The method for concentrating a valuable metal contained in a lithium ion secondary battery according to <1> or <2>, wherein in the thermal treatment step, the lithium ion secondary battery is thermally treated in a state of being contained in a case having a melting point higher than or equal to a thermal treatment temperature.

<4> The method for concentrating a valuable metal contained in a lithium ion secondary battery according to <3>, wherein the case is an exterior case of a pack, a module, or a cell of the lithium ion secondary battery.

<5> The method for concentrating a valuable metal contained in a lithium ion secondary battery according to any one of <1> to <4>, wherein in the thermal treatment step, thermal treatment is performed under a condition that carbon is present by 10% by mass or greater relative to a total percentage by mass of either or both of cobalt and nickel contained in the lithium ion secondary battery or the positive electrode material thereof.

<6> The method for concentrating a valuable metal contained in a lithium ion secondary battery according to <5>, wherein the carbon contains carbon derived from a negative electrode material of the lithium ion secondary battery.

<7> The method for concentrating a valuable metal contained in a lithium ion secondary battery according to any one of <1> to <6>, further including:

a pulverizing step of pulverizing a thermally treated product of the lithium ion secondary battery or the positive electrode material thereof obtained in the thermal treatment step; and a sorting step of sorting and recovering a product in which either or both of cobalt and nickel are concentrated, from a pulverized product of the thermally treated product obtained in the pulverizing step.

<8> The method for concentrating a valuable metal contained in a lithium ion secondary battery according to <7>, wherein the sorting step includes:

a first sorting step of classifying the pulverized product obtained in the pulverizing step using a sieve having a mesh size of from 0.1 mm through 2.4 mm, to classify the pulverized product into a coarse-grained product and a fine-grained product; and a second sorting step of subjecting the fine-grained product obtained in the first sorting step to separation utilizing difference in at least one of magnetic property, particle diameter, and specific gravity.

<9> The method for concentrating a valuable metal contained in a lithium ion secondary battery according to <8>, further including:

a more finely pulverizing step of more finely pulverizing the fine-grained product obtained in the first sorting step, wherein a more finely pulverized product obtained in the more finely pulverizing step is subjected to the second sorting step.

<10> The method for concentrating a valuable metal contained in a lithium ion secondary battery according to <9>, wherein a cumulative 50% volume-based particle diameter $D_{50}$ of the more finely pulverized product is 75 μm or less.

<11> The method for concentrating a valuable metal contained in a lithium ion secondary battery according to any one of <7> to <10>, wherein the sorting step is a magnetic sorting step, and a magnetic flux density of a magnet in the magnetic sorting step is 0.01 tesla or higher and 2 tesla or lower.

<12> The method for concentrating a valuable metal contained in a lithium ion secondary battery according to <11>, wherein the magnetic sorting step is wet magnetic sorting.

<13> The method for concentrating a valuable metal contained in a lithium ion secondary battery according to <12>, wherein a dispersant is added by 50 mg/L or greater to a slurry used in the wet magnetic sorting.

<14> The method for concentrating a valuable metal contained in a lithium ion secondary battery according to <12> or <13>, wherein a slurry used in the wet magnetic sorting is subjected to particle dispersion treatment by ultrasonic waves.

<15> The method for concentrating a valuable metal contained in a lithium ion secondary battery according to any one of <1> to <14>, wherein in the thermal treatment step, thermal treatment is performed at 750 °C or higher and 1,200 °C or lower for 1 hour or longer.

<16> A method for concentrating a valuable metal contained in a lithium ion secondary battery, for processing a lithium ion secondary battery or a positive electrode material of the lithium ion secondary battery, the lithium ion secondary battery or the positive electrode material containing at least one element selected from the group consisting of cobalt and nickel, to concentrate a valuable metal containing either or both of cobalt and nickel, the method including:

a thermal treatment step of heating the lithium ion secondary battery or the positive electrode material thereof to from 600 °C through 1,200 °C;

a pulverizing classifying step of pulverizing and classifying a thermally treated product obtained in the thermal treatment step; and a further thermal treatment step of further heating a fine-grained product obtained in the pulverizing classifying step to from 300 °C through 1,200 °C, to form a granular aggregate containing at least one valuable metal selected from the group consisting of cobalt and nickel.

<17> The method for concentrating a valuable metal contained in a lithium ion secondary battery according to <16>, wherein a negative electrode material of the lithium ion secondary battery contains carbon.

<18> The method for concentrating a valuable metal contained in a lithium ion secondary battery according to <16> or <17>, including:

a sorting step of sorting and recovering a product in which either or both of cobalt and nickel are concentrated, from a further thermally treated product obtained in the further thermal treatment step.

<19> The method for concentrating a valuable metal contained in a lithium ion secondary battery according to <18>, wherein in the sorting step, the product in which either or both of cobalt and nickel are concentrated and a product in which manganese is concentrated are recovered.

<20> The method for concentrating a valuable metal contained in a lithium ion secondary battery according to <18> or <19>, wherein the sorting step is a step of performing separation utilizing difference in at least one of magnetic property, particle diameter, and specific gravity.

<21> The method for concentrating a valuable metal contained in a lithium ion secondary battery according to any one of <16> to <20>, wherein in the thermal treatment step, the lithium ion secondary battery is contained in a case containing aluminum, and aluminum derived from the case is separated during the heating.

<22> The method for concentrating a valuable metal contained in a lithium ion secondary battery according to any one of <16> to <21>, wherein in the pulverizing classifying step, pulverization by an impact, shearing, or compression is performed, and classification is performed using a sieve having a mesh size of from 0.1 mm through 2.4 mm.

<23> The method for concentrating a valuable metal contained in a lithium ion secondary battery according to any one of <16> to <22>, wherein in the further thermal treatment step, a cumulative 50% volume-based particle diameter $D_{50}$ of the granular aggregate containing at least one metal selected from the group consisting of cobalt and nickel is 1 μm or greater.

<24> The method for concentrating a valuable metal contained in a lithium ion secondary battery according to any one of <18> to <23>, wherein the sorting step is a magnetic sorting step, and a magnetic flux density of a magnet in the magnetic sorting step is 0.01 tesla or higher and 2 tesla or lower.

<25> The method for concentrating a valuable metal contained in a lithium ion secondary battery according to <24>, wherein the magnetic sorting step is wet magnetic sorting, and a dispersant is added by 50 mg/L or greater to a slurry used in the wet magnetic sorting.

<26> The method for concentrating a valuable metal contained in a lithium ion secondary battery according to <25>, wherein the slurry used in the wet magnetic sorting is subjected to particle dispersion treatment by ultrasonic waves.

<27> The method for concentrating a valuable metal contained in a lithium ion secondary battery according to any one of <16> to <26>, wherein in either or both of the thermal treatment step and the further thermal treatment step, a reducing component is added to form a reducing atmosphere.

<28> The method for concentrating a valuable metal contained in a lithium ion secondary battery according to any one of <16> to <27>, wherein in the thermal treatment step or the further thermal treatment step, the heating is performed in an air atmosphere or an oxidizing atmosphere for a part of a thermal treatment time, to decrease a grade of a reducing component in the thermally treated product or a further thermally treated product.

<29> The method for concentrating a valuable metal contained in a lithium ion secondary battery according to any one of <18> to <28>, wherein after the further thermal treatment step and before the sorting step, a further pulverizing step of further pulverizing the thermally treated product is performed.

<30> The method for concentrating a valuable metal contained in a lithium ion secondary battery according to any one of <16> to <29>, wherein the fine-grained product obtained in the pulverizing classifying step is subjected to a magnetic sorting step using a magnetic force, and magnetically attractable materials obtained in the magnetic sorting step are subjected to the further thermal treatment step.

Advantageous Effects of Invention

According to a first embodiment of the present invention, a lithium ion secondary battery or a positive electrode material thereof is thermally treated, to form a granular aggregate containing at least one valuable metal selected from the group consisting of cobalt and nickel. Therefore, it is possible to provide a method for concentrating a valuable metal contained in a lithium ion secondary battery, the method being able to easily obtain metal moieties in which cobalt and nickel are concentrated and to facilitate separation from other battery constituting components.

According to a second embodiment of the present invention, pulverization and classification are performed after thermal treatment is performed at a predetermined temperature, and a further thermal treatment is then performed. Therefore, it is possible to provide a method for concentrating a valuable metal contained in a lithium ion secondary battery, the method being able to easily obtain metal moieties in which cobalt and nickel are concentrated and to facilitate separation from other battery constituting components.

In other words, the present invention can provide a method for concentrating a valuable metal contained in a lithium ion secondary battery, the method being targeted at used lithium ion secondary batteries, or positive electrode materials of used lithium ion secondary batteries, or their process scraps, the method being able to easily obtain metal moieties in which cobalt and nickel are concentrated and to facilitate separation of not only cobalt and nickel but also manganese from other battery constituting components, particularly positive electrode active substances such as composite oxides containing cobalt, nickel, and manganese.

DESCRIPTION OF EMBODIMENTS

Figure 1:
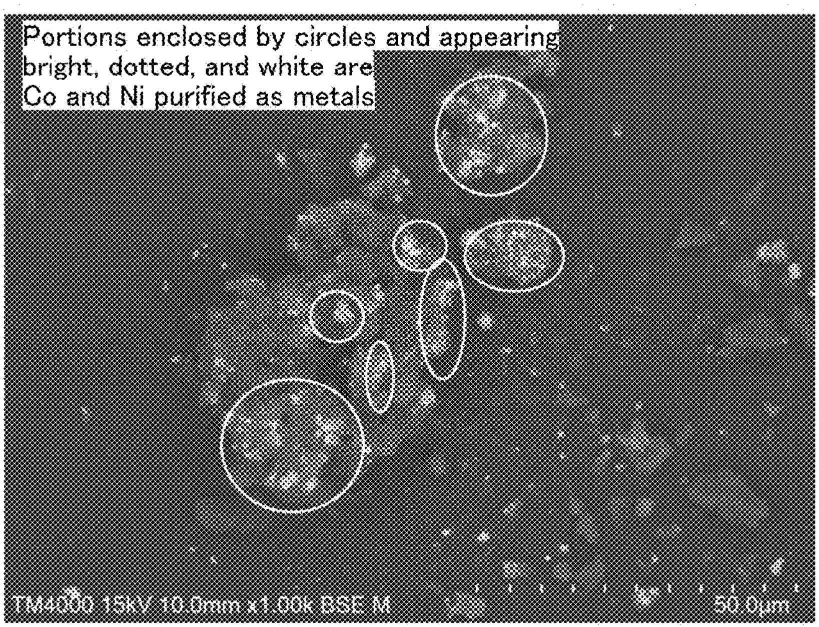
FIG. 1 is an image, captured by a scanning electron microscope (SEM, available from Hitachi High-Technologies Corporation, TM4000PLUS), representing an example of a part of a fine-grained product (containing a positive electrode material) obtained by thermally treating, pulverizing, and sieving a ternary system lithium ion secondary battery containing cobalt, nickel, and manganese in Example of the present invention, where all SEM images of the drawings of the present invention are captured by the same device.

In the method for concentrating a valuable metal contained in a lithium ion secondary battery according to the first embodiment of the present invention, a thermal treatment step of thermally treating the lithium ion secondary battery or a positive electrode material thereof, to form a granular aggregate containing at least one valuable metal selected from the group consisting of cobalt and nickel is performed. In this way, either or both of cobalt and nickel are purified as a metal, and granular aggregates of valuable metals in which the concentrations of cobalt and nickel are high (or cobalt and nickel are concentrated) are formed.

Hence, in the first embodiment of the present invention, a valuable resource in which either or both of cobalt and nickel are concentrated is obtained from a lithium ion secondary battery containing at least one element selected from the group consisting of cobalt and nickel as a constituting component or a positive electrode material of the lithium ion secondary battery. Either or both of cobalt and nickel are purified as metals through thermal treatment, and cobalt and nickel are subsequently sorted from other battery constituting components through a pulverizing step and a sorting step. In this way, valuable resources in which the concentrations of cobalt and nickel are even higher (or cobalt and nickel are concentrated) are obtained.

In the first embodiment of the present invention, it is preferable to perform the thermal treatment in a reducing atmosphere or an inert atmosphere. In the first embodiment of the present invention, the thermal treatment performed in a reducing atmosphere or an inert atmosphere makes it easier to form granular aggregates containing at least one valuable metal selected from the group consisting of cobalt and nickel.

Purification as a metal represents a phenomenon in which cobalt or nickel existing in the form of compounds such as cobalt and nickel-containing oxides, lithium cobaltate ($LiCoO_2$), lithium cobalt-nickelate ($LiCo_{1/2}Ni_{1/2}O_2$), $LiNi_xCo_yMn_zO_2$ (x+y+z=1) referred to as, for example, a ternary system or an NCM system, and $LiNi_xCo_yAl_z$ (x+y+z=1) referred to as, for example, an NCA system is changed to a metal. Purification as a metal encompasses purification by all particles and purification by some particles, and a purified product need not necessarily be a pure substance. Hence, purification of cobalt or nickel as a metal represents a change to a state having a specific gravity and a magnetic property that are close to those of cobalt or nickel metal. Purified cobalt or nickel may be a cobalt or nickel alloy.

In the method for concentrating a valuable metal contained in a lithium ion secondary battery according to the second embodiment of the present invention, a lithium ion secondary battery containing at least one element selected from the group consisting of cobalt and nickel or a positive electrode material of the lithium ion secondary battery is subjected to a thermal treatment step, a pulverizing classifying step, and a further thermal treatment step, to purify either or both of cobalt and nickel as metals, and form granular aggregates of valuable metals in which the concentrations of cobalt and nickel are high (or cobalt and nickel are concentrated). In the thermal treatment step, a positive electrode material present in the form of an oxide containing cobalt, nickel, manganese, and lithium is thermally treated in a state of being enveloped by the members of a lithium ion secondary battery cell, module, or pack. Through this thermal treatment, it is possible to form cobalt and nickel metals efficiently while suppressing combustion consumption of carbon contained in the lithium ion secondary battery. These cobalt and nickel metals are in the form of forming aggregate particles with particles of oxides of, for example, manganese.

When the thermally treated product obtained in the thermal treatment step is pulverized and classified, a resultant fine-grained product mainly contains cobalt, nickel, manganese, and carbon. When these powder products are further thermally treated, cobalt and nickel grow into even larger granular aggregates from nuclei formed of fine cobalt and nickel metals produced in the thermal treatment step (cobalt and nickel oxides that are to form aggregates with the fine cobalt and nickel metals are reduced to thereby increase the particle diameter of the fine metals), and the granular aggregates melt and combine with each other to further increase in the particle diameter. As a result, a clear solid-solid interface is formed between the cobalt and nickel metals, and the oxides of, for example, manganese with which the cobalt and nickel metals have been forming aggregates. This facilitates sorting and concentration.

Hence, in the second embodiment, cobalt and nickel metals are formed in the thermal treatment step, the metals are separated into cobalt and nickel, and manganese in the pulverizing classifying step, and the cobalt and nickel purified as metals are grown into granular aggregates in the further thermal treatment step, making it possible to form even larger granular aggregates. Hence, in the second embodiment, it is easier to recover cobalt and nickel purified as metals, because large granular aggregates of cobalt and nickel purified as metals can be obtained.

The further thermal treatment step is performed on powder products. This improves the efficiency at which fine metals and oxides of cobalt and nickel contact carbon, and enables formation of the granular aggregates. The further thermal treatment causes not only formation of the granular aggregates and but also combustion of carbon. Therefore, the carbon grade in the further thermally treated product can be reduced.

If the thermal treatment in the previous step is performed at lower than 600 °C, it is more difficult to form fine cobalt and nickel metals through this thermal treatment. Therefore, the thermal treatment in the further thermal treatment would be performed in a state in which nuclei for growth of cobalt and nickel granular aggregates are not present, carbon would be combusted and consumed before cobalt and nickel granular aggregates are formed, and cobalt and nickel would not be able to grow into sufficiently large granular aggregates. Moreover, cobalt and nickel, and, for example, manganese would be left forming oxides and present in a state in which it is difficult to separate cobalt and nickel from manganese by physical sorting or to sufficiently magnetize them.

In the second embodiment of the present invention, when either or both of the thermal treatment step and the further thermal treatment step are performed in an air atmosphere or an oxidizing atmosphere for at least a part of the combustion time, the grade of a reducing component in the resultant thermally treated product of either or both of cobalt and nickel can be reduced. That is, inclusion of a reducing component into the fine-grained product described below can be avoided because the reducing component contained in the thermally treated product is consumed.

First Embodiment

As the first embodiment of the present invention described above, an embodiment in which a valuable metal contained in a lithium ion secondary battery is concentrated through a thermal treatment step will be described below.

<Thermal Treatment Step>

The thermal treatment step is a step of thermally treating a lithium ion secondary battery (LIB) or a positive electrode material thereof in a reducing atmosphere or an inert atmosphere, to form a granular aggregate containing at least one valuable metal selected from the group consisting of cobalt and nickel.

The thermal treatment temperature in the thermal treatment step is preferably, for example, 600 °C or higher and 1,200 °C or lower, more preferably 700 °C or higher and 1,200 °C or lower, and yet more preferably 750 °C or higher and 1,100 °C or lower.

When the thermal treatment temperature is 600 °C or higher, it is possible to purify cobalt and nickel as metals efficiently. When the thermal treatment temperature is 1,200 °C or lower, it is possible to save energy and costs necessary for the thermal treatment.

The thermal treatment time is not particularly limited, may be appropriately selected in accordance with the intended purpose, and is preferably 30 minutes or longer and 5 hours or shorter and more preferably 1 hour or longer and 3 hours or shorter. The thermal treatment time needs at least to be a thermal treatment time taken until cobalt and nickel reach a desired temperature at which cobalt and nickel are purified as metals, and a retention time needs at least to be secured for as long as purification as metals proceeds. When the thermal treatment time is in the preferable range, there is an advantage in terms of the costs taken for the thermal treatment.

Hence, it is preferable to perform the thermal treatment at 750 °C or higher and 1,200 °C or lower for 1 hour or longer.

The thermal treatment method is not particularly limited and may be appropriately selected in accordance with the intended purpose. Examples of the thermal treatment method include a method using a thermal treatment furnace. Examples of the thermal treatment furnace include batch-type furnaces such as a muffle, a tunnel furnace, a rotary kiln, a fluidized bed furnace, a cupola, and a stoker furnace.

The thermal treatment can be performed in an air atmosphere or an oxidizing atmosphere, but may also be performed in a reducing atmosphere or an inert atmosphere.

Examples of the reducing atmosphere include a low oxygen level atmosphere in which, for example, hydrogen and carbon monoxide are present. Specifically, the atmosphere may be adjusted to an oxygen level of 15% or lower.

Examples of the inert atmosphere include an atmosphere formed of nitrogen or argon. A reducing component may further be added to the inert atmosphere in order to facilitate obtaining granular aggregates in which cobalt and nickel are purified as metals and concentrated.

Hence, in the present invention, when performing the thermal treatment in an inert atmosphere, it is preferable to perform the thermal treatment under a condition that a reductant is present. This makes it possible to efficiently purify cobalt and nickel as metals.

Examples of the reductant include carbon, hydrogen, carbon monoxide, hydrocarbon gas, and hydrocarbon compounds. As carbon serving as the reductant, for example, carbon derived from a negative electrode material of a lithium ion secondary battery can be used. The addition amount of the reducing component is preferably 0.1% or greater by mass ratio relative to the content of either or both of cobalt and nickel. That is, in the present invention, it is preferable to perform the thermal treatment in the thermal treatment step in a state in which carbon is present by 10% by mass or greater relative to the total percentage by mass of either or both of cobalt and nickel contained in the lithium ion secondary battery or a positive electrode material thereof.

Here, a purification reaction of cobalt or nickel as metals does not proceed smoothly merely when, for example, cobalt and nickel-containing compounds such as oxides, lithium cobaltate ($LiCoO_2$), lithium cobalt-nickelate ($LiCo_{1/2}Ni_{1/2}O_2$), $LiNi_xCo_yMn_zO_2$(x+y+z=1) referred to as a ternary system or an NCM system, and $LiNi_xCo_yAl_z$(x+y+z=1) referred to as an NCA system are thermally treated in the air.

However, even if the oxygen level is high to some extent, so long as the temperature is high, there is a tendency that purification as metals proceeds smoothly and particles of purified metals have a large size. In this case, the thermal treatment temperature is preferably from 750 °C through 1,200 °C as described above.

Moreover, even if the oxygen level is high to some extent, purification as metals proceeds smoothly so long as a reductant is present sufficiently (so long as there is a reducing atmosphere).

A low oxygen level atmosphere (hypoxia atmosphere) may be realized by a method of, for example, placing a lithium ion secondary battery or a positive electrode material thereof in an oxygen shielding container and thermally treating the lithium ion secondary battery or the positive electrode material thereof.

The material of the oxygen shielding container is not particularly limited and may be appropriately selected in accordance with the intended purpose so long as the material has durability against the combustion temperature and the internal pressure. Examples of the material include iron and stainless steel having a high melting point. It is preferable to form an opening in the oxygen shielding container because a lithium ion secondary battery emits a gas due to combustion of the internal electrolytic solution and the gas pressure rises. In this case, the opening ratio, which is the ratio of the opening area of the opening to the surface area of the container in which the opening is formed, is preferably 12.5% or less and more preferably 6.3% or less.

When the opening ratio is 12.5% or less, it is possible to suppress oxidization of cobalt and nickel due to roasting and to purify cobalt and nickel as metals more efficiently.

Through the thermal treatment of a lithium ion secondary battery together with the exterior case of a lithium ion secondary battery pack, module, or cell, purification of cobalt and nickel as metals can proceed more smoothly with oxygen shielding. That is, in the present invention, for example, the exterior case of a lithium ion secondary battery pack, module, or cell can be used as the oxygen shielding container.

Hence, in the present invention, it is preferable to thermally treat a lithium ion secondary battery in the thermal treatment step in a state in which the lithium ion secondary battery is contained in a case having a melting point higher than or equal to the thermal treatment temperature. The exterior case of the lithium ion secondary battery pack, module or cell can be suitably used as the case.

The cumulative 50% volume-based particle diameter $D_{50}$ of cobalt and nickel purified as metals is preferably 1 μm or greater, and more preferably 1 μm or greater and 5,000 μm or less. When the cumulative 50% volume-based particle diameter $D_{50}$ is 1 μm or greater, there is an advantage that separation and concentration in the subsequent sorting step will be facilitated.

The cumulative 50% volume-based particle diameter $D_{50}$ can be measured with, for example, a particle size distribution analyzer.

Through the thermal treatment described above, a thermally treated product (LIB thermally treated product) in which cobalt and nickel purified as metals and other components are mixed is obtained. It is preferable to subject the thermally treated product to a pulverizing step and a sorting step for isolating cobalt and nickel, which are concentration target valuable resources. This makes it possible to bring cobalt and nickel into a state easily sortable from other battery constituting components (for example, manganese, aluminum, lithium, copper, iron, and carbon).

<Pulverizing Step>

After the thermal treatment step, it is preferable to perform a pulverizing step of pulverizing the thermally treated product obtained in the thermal treatment. In other words, in the present invention, it is preferable to further include a pulverizing step of pulverizing the thermally treated product of the lithium ion secondary battery or the positive electrode material thereof obtained in the thermal treatment step.

The pulverization method in the pulverizing step is not particularly limited and may be appropriately selected in accordance with the intended purpose. Examples of the pulverization method by an impact include a method of throwing the thermally treated product using a rotating beating board and slamming the thermally treated product against an impact board to apply an impact, and a method of beating the thermally treated product using a rotating beater. The method can be performed with, for example, a hammer crusher and a chain crusher. Other examples of the pulverization method include a method of beating the thermally treated product using a ball or a rod formed of, for example, a ceramic or iron. The method can be performed with, for example, a ball mill and a rod mill. A pulverization method by compression may be performed by pulverization using a biaxial crusher having a short width of cut and a short blade length.

Active substances and current collectors are pulverized by an impact and compression. On the other hand, copper in the current collectors does not appreciagly change in the form and exists in the form of, for example, foils. Through the pulverization, separation occurs into the positive electrode active substance containing cobalt and nickel, into iron, stainless steel, and aluminum that constitute the housing, and into the copper current collectors. Pulverized products can be obtained in a state that can be efficiently sorted in the sorting step into the positive electrode active substance, into iron, stainless steel, and aluminum, and into the copper current collectors.

Through the pulverizing step, concentrates of cobalt and nickel are isolated from the thermally treated product (LIB thermally treated product) in which cobalt and nickel purified as metals and other components have been mixed. A preferable size of the concentrates is 2.4 mm or less.

The pulverization time in the pulverizing step is not particularly limited, and may be appropriately selected in accordance with the intended purpose. The pulverization time per 1 kg of a lithium ion secondary battery is preferably 0.1 seconds or longer and 30 minutes or shorter, more preferably 0.2 seconds or longer and 10 minutes or shorter, and particularly preferably 0.3 seconds or longer and 5 minutes or shorter. When the pulverization time is 1 second or longer and 30 minutes or shorter, the thermally treated product can be pulverized to a size better suited to classification.

<Sorting Step>

After the pulverizing step, it is preferable to perform a sorting step of sorting cobalt and nickel from other positive electrode active substance constituting components including manganese oxide or aluminum oxide in the pulverized product obtained in the pulverizing step. In other words, in the present invention, it is preferable to include a sorting step of sorting and recovering a product in which either or both of cobalt and nickel are concentrated, from the pulverized product of the thermally treated product obtained in the pulverizing step.

The sorting step is not particularly limited and may be appropriately selected in accordance with the intended purpose so long as a product in which either or both of cobalt and nickel are concentrated can be sorted and recovered from the pulverized product. It is preferable that the sorting step include a first sorting step and a second sorting step described below.

<<First Sorting Step>>

The first sorting step is a step of classifying the pulverized product obtained in the pulverizing step into a coarse-grained product and a fine-grained product. The classifying method is not particularly limited and may be appropriately selected in accordance with the intended purpose. Examples of the classifying method include a vibrating sieve, a multi-stage vibrating sieve, a cyclone, a JIS Z8801 standard sieve, a wet vibrating table, and an air table.

The mesh size (classification point) in the first sorting step is not particularly limited, may be appropriately selected in accordance with the intended purpose, and is preferably 0.1 mm or greater and 2.4 mm or less and more preferably 0.6 mm or greater and 2.4 mm or less.

When the classification point is 2.4 mm or less, it is possible to suppress inclusion of metals derived from the exterior container and the copper current collector into the fine-grained product, and to improve the performance of separation of cobalt and nickel that are derived from active substances. When the mesh size is 0.1 mm or greater, it is possible to improve the rate at which cobalt and nickel that are derived from active substances are recovered in the fine-grained product.

When a sieve is used as the classifying method, sieving performed by placing a loosening promoting object such as stainless-steel balls and alumina balls on the sieve in order to separate small pulverized products adhering to large pulverized products from the large pulverized products enables efficient separation into the large pulverized products and the small pulverized products. Iron will be mainly contained in a coarse-grained product.

A pulverizing classifying step (pulverization and classification) of classifying a pulverized product into a coarse-grained product and a fine-grained product while performing pulverization may be performed.

<<Second Sorting Step>>

The second sorting step is a step of separating the fine-grained product obtained in the first sorting step utilizing difference in at least one of magnetic property, particle diameter, and specific gravity. Through the second sorting step, valuable metals in which the concentrations of cobalt and nickel are high (or cobalt and nickel are concentrated) can be obtained.

<<Second Sorting Step Utilizing Difference in Magnetic Property (Magnetic Sorting)>>

Utilizing a nature that cobalt and nickel are magnetically attractable when they are individual metal bodies, it is possible to subject the fine-grained product obtained in the first sorting step to a wet or dry magnetic sorting step (dry magnetic sorting or wet magnetic sorting). As a result, valuable resources in which cobalt and nickel purified as metals are concentrated can be concentrated as magnetically attractable materials. As non-magnetically attractable materials, materials in which manganese, aluminum, lithium, copper, and carbon are concentrated can be concentrated.

The second sorting step utilizing the difference in magnetic property (magnetic sorting) may be the same as the magnetic sorting step in the first embodiment described above. Hence, the second sorting step utilizing the difference in magnetic property is preferably, for example, a wet magnetic sorting step. The magnetic flux density of a magnet used in magnetic sorting is preferably 0.01 tesla or higher and 2 tesla or lower. By performing magnetic sorting using a magnet having a magnetic flux density of 0.02 tesla or higher and 2 tesla or lower, it is possible to obtain valuable resources in which the concentrations of cobalt and nickel are high (or cobalt and nickel are concentrated).

In the case of, for example, a ternary system positive electrode active substance ($LiNi_xCo_yMn_zO_2$ (x+y+z=1)), it is possible to obtain a valuable resource in which the concentrations of cobalt and nickel are high (or cobalt and nickel are concentrated) from the ternary system positive electrode active substance by magnetically sorting a fine-grained product of the ternary system positive electrode active substance obtained through the pulverizing step and the first sorting step to separate cobalt and nickel from manganese.

Wet magnetic sorting is preferable as magnetic sorting. This is because wet magnetic sorting can suppress cross-linked aggregation of particles due to moisture between the particles caused by dry magnetic sorting, can improve separability of particles, and can obtain cobalt and nickel at a higher purity.

In the wet magnetic sorting, a dispersant may be added to a slurry to be used. By adding a dispersant, it is possible to promote separation of cobalt and nickel from other battery constituting components. The addition amount of the dispersant is preferably 50 mg/L or greater.

It is preferable to subject the slurry used in the wet magnetic sorting to a particle dispersion treatment by ultrasonic waves. Through a particle dispersion treatment by ultrasonic waves, it is possible to promote separation of cobalt and nickel from other battery constituting components.

<<Second Sorting Step Utilizing Particle Diameter and Specific Gravity (Particle Diameter and Specific Gravity Sorting)>>

By subjecting the fine-grained product obtained in the first sorting step to classification and sorting by particle diameter or to specific gravity sorting, it is possible to obtain valuable resources in which the concentrations of cobalt and nickel purified as metals are high (or cobalt or nickel are concentrated).

It is possible to perform the second sorting step utilizing particle diameter and specific gravity (particle diameter and specific gravity sorting), using various devices raised as examples of the device utilizing the classifying method and the specific gravity sorting method or a combined principle of these methods in the first embodiment described above.

The device utilizing the classifying method and the specific gravity sorting method or a combined principle of these methods is not particularly limited and may be appropriately selected in accordance with the intended purpose. Examples of the device include dry fine particle classifiers such as a vibrating sieve, a dry cyclone, a turbo classifier, an aero fine classifier, a micron classifier, an elbow jet classifier, CLIFFIS CF, and an electrostatic sorter, and wet fine particle classifiers such as a hydro cyclone, a Falcon concentrator, a Knelson concentrator, a multi-gravity separator, a laboratory mineral separator, a Bartles crossbelt vanner, a Kelsey jig, an alter jig, an i Classifier, and an upright cylindrical wet classifier.

The device is not particularly limited and the devices described above may be appropriately used in combination so long as intended valuable resources in which the concentrations of cobalt and nickel are high (or cobalt and nickel are concentrated) can be obtained.

In the case of, for example, a ternary system positive electrode active substance ($LiNi_xCo_yMn_zO_2$ (x+y+z=1)), it is possible to obtain valuable resources in which the concentrations of cobalt and nickel are high (or cobalt or nickel are concentrated) from the ternary system positive electrode active substance also by a method of sorting the fine-grained product of the ternary system positive electrode active substance obtained through the pulverizing step and the first sorting step utilizing the difference in specific gravity between cobalt and nickel particles and manganese oxide particles and by a method of classifying the fine-grained product utilizing the difference in particle diameter between them.

Magnetic sorting, sorting by specific gravity, and sorting utilizing the difference in particle diameter described above, or sorting by combinations thereof can sort cobalt and nickel not only from manganese oxide, but also from other battery constituting components such as aluminum, lithium, copper, iron, and carbon.

<More Finely Pulverizing Step>

In the present invention, it is preferable to subject the fine-grained product obtained before the second sorting step, i.e., in the first sorting step, further to a more finely pulverizing step. That is, in the present invention, it is preferable to include a more finely pulverizing step of more finely pulverizing the fine-grained product obtained in the first sorting step, and to subject a more finely pulverized product obtained in the more finely pulverizing step to the second sorting step.

This can suppress particles of cobalt and nickel purified as metals and other battery constituting components from forming a lump in which they aggregate or mix. This enables more accurate separation of cobalt and nickel metals from manganese oxide into individual bodies.

The fine pulverizer is not particularly limited and may be appropriately selected in accordance with the intended purpose. Examples of the fine pulverizer include a bead mill, a roller mill, a jet mill, a hammer mill, a pinned mill, a rotary mill, a vibrating mill, a planetary ball mill, and an attritor.

The cumulative 50% volume-based particle diameter $D_{50}$ of the more finely pulverized product obtained in the more finely pulverizing step is preferably 75 μm or less, more preferably 0.1 μm or greater and 75 μm or less, and yet more preferably 0.5 μm or greater and 53 μm or less. Fine pulverization to a cumulative 50% volume-based particle diameter $D_{50}$ or 75 μm or less can promote separation of cobalt and nickel metals from other constituents into individual bodies.

When the finely pulverized product has a cumulative 50% volume-based particle diameter $D_{50}$ of 0.1 μm or greater, it is possible to prevent degradation of separability between cobalt and nickel, and other battery constituting components due to aggregation between them due to crosslinking and an electrostatic attractive force attributable to the moisture between particles.

The cumulative 50% volume-based particle diameter $D_{50}$ can be measured with, for example, a particle size distribution analyzer.

<Other Steps>

The other steps are not particularly limited and may be appropriately selected in accordance with the intended purpose. Examples of the other steps include a valuable resource recovering step and a valuable resource refining step.

Second Embodiment

In the following description, an embodiment in which a valuable metal contained in a lithium ion secondary battery is concentrated through a thermal treatment step, a pulverizing classifying step, and a further thermal treatment step will be described as the second embodiment of the present invention described above.

In the second embodiment, any steps corresponding to the steps of the first embodiment other than the thermal treatment step and the further thermal treatment step may be the same as in the first embodiment. Therefore, description may be skipped as needed.

<Thermal Treatment Step>

In the thermal treatment step, a lithium ion secondary battery or a positive electrode material thereof is heated to from 600 °C through 1,200 °C.

It is preferable to perform heating at a thermal treatment temperature of from 700 °C through 1,200 °C, more preferably from 750 °C through 1,100 °C because the electrode material is thermally decomposed. When the thermal treatment temperature is lower than 600 °C, the intended purification reaction of cobalt and nickel as metals does not proceed smoothly. Moreover, it is difficult to melt and separate aluminum derived from the housing, and this increases a load in the pulverizing step. When the thermal treatment temperature is higher than 1,200 °C, costs will increase in terms of energy and economical aspects. When the thermal treatment temperature is higher than 1,200 °C, there is another problem that copper foils melt and become difficult to recover.

The thermal treatment time may be appropriately selected so long as melted aluminum can be separated, and is preferably 30 minutes or longer and 5 hours or shorter and more preferably 1 hour or longer and 3 hours or shorter. The thermal treatment time is preferably a thermal treatment time in which a reducing component will become no longer present in a thermally treated product to be obtained. It is preferable to perform heating at from 750 °C through 1,100 °C for 1 hour or longer in terms of costs taken for the thermal treatment.

The thermal treatment method is not particularly limited and may be appropriately selected in accordance with the intended purpose. Examples of the thermal treatment method include a method using a thermal treatment furnace. Examples of the thermal treatment furnace include batch-type furnaces such as a muffle, a tunnel furnace, a rotary kiln, a fluidized bed furnace, a cupola, and a stoker furnace.

The thermal treatment may be performed in an air atmosphere or an oxidizing atmosphere, but may also be performed in a reducing atmosphere or an inert atmosphere.

Examples of the reducing atmosphere include a low oxygen level atmosphere in which, for example, hydrogen and carbon monoxide are present. Specifically, the atmosphere may be adjusted to an oxygen level of 15% or lower.

Examples of the inert atmosphere include an atmosphere formed of nitrogen or argon. A reducing component may further be added to the inert atmosphere in order to facilitate obtaining granular aggregates in which cobalt and nickel are purified as metals and concentrated.

Hence, in the present invention, when performing the thermal treatment in an inert atmosphere, it is preferable to perform the thermal treatment under a condition that a reductant is present. This makes it possible to efficiently purify cobalt and nickel as metals.

Examples of the reductant include carbon, hydrogen, carbon monoxide, hydrocarbon gas, and hydrocarbon compounds. As carbon serving as the reductant, for example, carbon derived from a negative electrode material of a lithium ion secondary battery can be used. The addition amount of the reducing component is preferably 0.1% or greater by mass ratio relative to the content of either or both of cobalt and nickel. That is, in the present invention, it is preferable to perform the thermal treatment in the thermal treatment step in a state in which carbon is present by 10% by mass or greater relative to the total percentage by mass of either or both of cobalt and nickel contained in the lithium ion secondary battery or a positive electrode material thereof.

In general, a purification reaction of cobalt or nickel as metals does not proceed smoothly merely when, for example, cobalt and nickel-containing compounds such as oxides, lithium cobaltate ($LiCoO_2$), lithium cobalt-nickelate ($LiCo_{1/2}Ni_{1/2}O_2$), $LiNi_xCo_yMn_zO_2$ (x+y+z=1) referred to as a ternary system or an NCM system, and $LiNi_xCo_yAl_z$ (x+y+z=1) referred to as an NCA system are thermally treated in the air.

However, when carbon derived from a negative electrode material acts as a reducing component, purification as metals may proceed smoothly in the air. Moreover, when the thermal treatment is at a heating temperature in a high temperature range of from 600 °C through 1,200 °C, there is a case where purification as metals can proceed smoothly and granular aggregates of purified metals having a small size can be obtained.

When the exterior case of a lithium ion secondary battery is formed of aluminum or contains aluminum, it is preferable to separate aluminum derived from the exterior case and melted in the thermal treatment, in terms of concentrating cobalt and nickel in a subsequent step.

<Pulverizing Classifying Step>

A thermally treated product (LIB thermally treated product) is obtained through the thermal treatment step. The thermally treated product mainly contains valuable metals such as cobalt and nickel, and other battery constituting components (for example, manganese, aluminum, lithium, copper, iron, and carbon).

Hence, in order to separate cobalt and nickel, which are the concentration target valuable metals, a pulverizing classifying step of pulverizing and classifying the LIB thermally treated product is performed.

As the pulverizing method, the same pulverizing method as in the pulverizing step of the first embodiment described above can be used.

When granular aggregates containing cobalt and nickel purified as metals have been formed through the thermal treatment step, the pulverizing method needs at least to perform pulverization only until the granular aggregates and other battery constituting components are loosened apart from each other. In the present invention, for example, a pulverization method such as a bead mill, a roller mill, a jet mill, a hammer mill, a pinned mill, a rotary mill, a vibrating mill, a planetary ball mill, and an attritor can be appropriately used.

The pulverization time may be the same as the pulverization time in the pulverizing step in the first embodiment described above.

Next, through classification, a fine-grained product containing cobalt and nickel, and a coarse-grained product containing an exterior case constituting components and other electrode constituting components, both of which constitute the pulverized product obtained through the pulverization, are separated from each other.

As the sorting method, it is preferable to sort the pulverized product using a mesh size (classification point) of from, for example, 0.1 mm through 2.4 mm. The classification point is more preferably from 0.6 mm through 2.4 mm.

When the classification point is 2.4 mm or less, it is possible to suppress inclusion of metals derived from the exterior container and a copper current collector into the fine-grained product, and to improve the performance of separation of cobalt and nickel that are derived from active substances. When the mesh size is 0.1 mm or greater, it is possible to improve the rate at which cobalt and nickel that are derived from active substances are recovered in the fine-grained product.

For classification, for example, dry fine particle classifiers such as a vibrating sieve, a JIS Z8801 standard sieve, a wet vibrating table, an air table, a dry cyclone, a turbo classifier, an aero fine classifier, a micron classifier, an elbow jet classifier, CLIFFIS CF, and an electrostatic sorter, and wet fine particle classifiers such as a hydro cyclone, a Falcon concentrator, a Knelson concentrator, a multi-gravity separator, a laboratory mineral separator, a Bartles crossbelt vanner, a Kelsey jig, an alter jig, an i Classifier, and an upright cylindrical wet classifier can be used.

When a sieve is used as the classifying method, sieving performed by placing a loosening promoting object such as stainless-steel balls and alumina balls on the sieve in order to separate small pulverized products adhering to large pulverized products from the large pulverized products enables efficient separation into the large pulverized products and the small pulverized products. Iron will be mainly contained in a coarse-grained product.

The pulverizing classifying step may be performed as a step of, for example, classifying the pulverized product into a coarse-grained product and a fine-grained product while pulverizing the pulverized product.

It is preferable to subject the fine-grained product obtained in the pulverizing classifying step to a magnetic sorting step using a magnetic force and to subject magnetically attractable materials obtained in the magnetic sorting step to the further thermal treatment step. In other words, it is preferable to magnetically sort the fine-grained product and to subject obtained magnetically attractable materials to the subsequent further thermal treatment step.

This increases the abundance ratio of cobalt and nickel, which are the magnetically attractable materials, and facilitates formation of granular aggregates in the further thermal treatment step.

<Further Thermal Treatment Step>

Next, in the further thermal treatment step, the fine-grained product obtained in the pulverizing classifying step is heated. The heating temperature is preferably 300 °C or higher and 1,200 °C or lower, more preferably 700 °C or higher and 1,100 °C or lower, and particularly preferably 750 °C or higher and 1,050 °C or lower.

As a result, granular aggregates of cobalt and nickel purified as metals that have been contained in the fine-grained product are formed. As the further thermal treatment temperature is higher, the reaction through which granular aggregates of purified metals are formed can proceed more smoothly. When the temperature is lower than 300 °C, the granular aggregates are not formed. When the temperature is higher than 1,200 °C, manganese melts and mixes in the granular aggregates as an unintended substance.

In the further thermal treatment step, for example, the powder containing cobalt and nickel, and manganese recovered as the fine-grained product through the previous pulverizing classifying step is further thermally treated with addition of carbon (derived from a negative electrode material) serving as a reductant as needed. This brings oxide particles containing cobalt and nickel, and manganese into a closer contact with the carbon particles serving as the reductant and facilitates a reduction reaction. As a result, a purification reaction as metals and granular aggregate formation are facilitated. As compared with this, in the initial thermal treatment step, because of the battery constitution, a negative electrode serving as a reductant and a positive electrode material containing cobalt and nickel, which are the targets to be reduced, are disposed in a layered state via a separator. Hence, although graining of these various materials and purification of cobalt and nickel as metals proceed, contact between these various kinds of powders and the reaction of granular aggregate formation do not readily proceed. Some lithium ion secondary batteries contain carbon in the positive electrode material as a conductive assistant, which contributes to a reduction reaction. However, recovering a powder containing cobalt and nickel, and manganese as the fine-grained product and subjecting the recovered powder to the further thermal treatment by adding carbon (derived from a negative electrode material) serving as a reductant as needed more securely ensures contact (or increases the likelihood of contact), and more securely facilitates a purification reaction as metals and granular aggregate formation.

The cumulative 50% volume-based particle diameter $D_{50}$ of the granular aggregates containing cobalt and nickel purified as metals formed in the further thermal treatment is preferably 1 μm or greater and more preferably from 5 μm through 1,000 μm. When the granular aggregates in which cobalt and nickel, which are valuable metals, are concentrated have such a size, it is possible to efficiently recover the granular aggregates. When the cumulative 50% volume-based particle diameter $D_{50}$ is 1 μm or greater, there is an advantage that separation and concentration in the subsequent sorting step will be facilitated. The cumulative 50% volume-based particle diameter $D_{50}$ may be measured with, for example, a particle size distribution analyzer.

Specifically, the size of the granular aggregate precursor contained in the fine-grained product is preferably from 0.01 μm through 1 μm, and the size of the granular aggregates obtained in the further thermal treatment is preferably from 1 μm through 100 μm.

The heating time in the further thermal treatment step may be appropriately selected so long as granular aggregates of cobalt and nickel can grow large, and is preferably 20 minutes or longer and 5 hours or shorter and more preferably 1 hour or longer and 3 hours or shorter. The thermal treatment time is preferably a heating time in which a reducing component will become no longer present in a thermally treated product to be obtained.

In terms of purification of cobalt and nickel as metals and formation of granular aggregates, the atmosphere used in the further thermal treatment is preferably a reducing atmosphere or an inert atmosphere as in the thermal treatment step described above. Moreover, in the further thermal treatment, it is preferable to perform heating in an air atmosphere or an oxidizing atmosphere for a part of the time. This can avoid inclusion of a reducing component into the fine-grained product because the reducing component contained in the thermally treated product is consumed.

It is preferable to perform a sorting step after the further thermal treatment step. Hence, the granular aggregates in which cobalt and nickel, or either of them is concentrated can be recovered separately from the further thermally treated product. As any other product than these granular aggregates, a product in which manganese is concentrated can be recovered.

Representatively, it is possible to perform a wet or dry magnetic sorting step (dry magnetic sorting or wet magnetic sorting), utilizing a nature that cobalt and nickel are magnetically attractable when they are individual metal bodies.

As a result, cobalt and nickel-containing granular aggregates formed from the fine-grained product through purification of cobalt and nickel as metals in the further thermal treatment step can be recovered as magnetically attractable materials. Manganese, aluminum, lithium, copper, and carbon can be recovered as non-magnetically attractable materials.

The magnetic flux density of a magnet used in magnetic sorting is preferably 0.01 tesla or higher and 2 tesla or lower. Magnetic sorting using a magnet having a magnetic flux density in this range can separate valuable metal granular aggregates in which the concentrations of cobalt and nickel are high (or cobalt and nickel are concentrated).

In the case of, for example, a ternary system positive electrode active substance ($LiNi_xCo_yMn_zO_2$ (x+y+z=1)), it is possible to recover granular aggregates in which the concentrations of cobalt and nickel are high (or cobalt and nickel are concentrated) as magnetically attractable materials from the ternary system positive electrode active substance, by magnetically sorting a thermally treated product of the ternary system positive electrode active substance obtained by further thermally treating the fine-grained product obtained as an undersize product in the pulverizing classifying step.

Wet magnetic sorting is preferable as magnetic sorting. This is because wet magnetic sorting can suppress cross-linked aggregation of particles due to moisture between the particles caused by dry magnetic sorting, can improve separability of particles, and can obtain cobalt and nickel at a higher purity.

In the wet magnetic sorting, a dispersant may be added to a slurry to be used. By adding a dispersant, it is possible to promote separation of cobalt and nickel from other battery constituting components. The addition amount of the dispersant is preferably 50 mg/L or greater.

It is preferable to subject the slurry used in the wet magnetic sorting to a particle dispersion treatment by ultrasonic waves. Through a particle dispersion treatment by ultrasonic waves, it is possible to promote separation of cobalt and nickel from other battery constituting components.

By further performing classification by particle diameter or specific gravity sorting instead of the magnetic sorting, it is possible to obtain valuable resources in which the concentrations of cobalt and nickel purified as metals are high (or cobalt and nickel purified as metals are concentrated).

A device utilizing the classifying method and the specific gravity sorting method or a combined principle of these methods is not particularly limited and may be appropriately selected in accordance with the intended purpose. Examples of the device include dry fine particle classifiers such as a vibrating sieve, a dry cyclone, a turbo classifier, an aero fine classifier, a micron classifier, an elbow jet classifier, CLIFFIS CF, and an electrostatic sorter, and wet fine particle classifiers such as a hydro cyclone, a Falcon concentrator, a Knelson concentrator, a multi-gravity separator, a laboratory mineral separator, a Bartles crossbelt vanner, a Kelsey jig, an alter jig, an i Classifier, and an upright cylindrical wet classifier.

The device is not particularly limited and the devices described above may be appropriately used in combination so long as intended valuable resources in which the concentrations of cobalt and nickel are high (or cobalt and nickel are concentrated) can be obtained.

Before the sorting step, the thermally treated product obtained by further thermally treating the fine-grained product may be further pulverized again.

This can suppress the granular aggregates containing cobalt or nickel purified as a metal and other battery constituting components from forming a lump in which they aggregate or mix. Moreover, cobalt or nickel is not appreciably finely grained by this further pulverization because they are metals, whereas oxides of, for example, manganese are easily finely grained by the further pulverization. Therefore, impurities other than cobalt or nickel can be selectively pulverized. Hence, by subjecting the further pulverized product to physical sorting such as classification, specific gravity sorting, and magnetic sorting, it is possible to concentrate cobalt and nickel as a coarse-grained product, a heavy product, or a magnetically attractable material, and separate oxides of, for example, manganese, which have become fine grains, as a fine-grained product, a light product, or a non-magnetically attractable material. Then, for example, magnetic sorting can more accurately separate cobalt and nickel metals from, for example, manganese oxide.

The further pulverization needs at least to be pulverization that loosens the granular aggregates in which cobalt and nickel are purified as metals apart from other battery constituting components with which the granular aggregates are mixed, while maintaining the granular aggregates. A pulverizer may be appropriately selected in accordance with the intended purpose. As the pulverizer, for example, a bead mill, a roller mill, a jet mill, a hammer mill, a pinned mill, a rotary mill, a vibrating mill, a planetary ball mill, and an attritor can be used.

<Other Steps>

Other steps are not particularly limited and may be appropriately selected in accordance with the intended purpose. Examples of the other steps include a valuable metal recovering step and a valuable metal refining step.

An example of a raw material, which is the target of the method for concentrating a valuable metal contained in a lithium ion secondary battery of the present invention described above, will be described below.

<Lithium Ion Secondary Battery>

A lithium ion secondary battery is a secondary battery that is charged or discharged through migration of lithium ions between a positive electrode and a negative electrode. Examples of the lithium ion secondary battery include: a battery cell including a positive electrode, a negative electrode, a separator, an electrolytic solution containing an electrolyte and an organic solvent, and an exterior container, which is a battery case in which the positive electrode, the negative electrode, the separator, and the electrolytic solution are contained; a module in which a plurality of such battery cells are coupled; and a battery pack, which is the module contained in a container.

For example, the shape, structure, size, and material of the lithium ion secondary battery are not particularly limited and may be appropriately selected in accordance with the intended purpose. Examples of the shape of the lithium ion secondary battery include a laminate shape, a cylindrical shape, a button shape, a coin shape, a square shape, and a flat shape.

<Positive Electrode, Positive Electrode Current Collector, and Positive Electrode Active Substance>

The positive electrode is not particularly limited and may be appropriately selected in accordance with the intended purpose so long as the positive electrode has a positive electrode material on a positive electrode current collector. The shape of the positive electrode is not particularly limited and may be appropriately selected in accordance with the intended purpose. Examples of the shape of the positive electrode include a flat plate shape and a sheet shape.

For example, the shape, structure, size, and material of the positive electrode current collector are not particularly limited and may be appropriately selected in accordance with the intended purpose. Examples of the shape of the positive electrode current collector include a foil shape. Examples of the material of the positive electrode current collector include stainless steel, nickel, aluminum, copper, titanium, and tantalum.

The positive electrode material is not particularly limited and may be appropriately selected in accordance with the intended purpose. Examples of the positive electrode material include a positive electrode material containing at least a positive electrode active substance containing a rare valuable metal, and containing a conducting agent and a binder resin as needed. The rare valuable metal is not particularly limited and may be appropriately selected in accordance with the intended purpose. It is preferable that either or both of cobalt and nickel be contained as the rare valuable metal.

Examples of the positive electrode active substance include lithium cobaltate ($LiCoO_2$), lithium cobalt-nickelate ($LiCo_{1/2}Ni_{1/2}O_2$), $LiNi_xCo_yMn_zO_2$ (x+y+z=1) referred to as a ternary system or NCM system, and $LiNi_xCo_yAl_z$ (x+y+z=1) referred to as a NCA system, or composite materials thereof.

<Negative Electrode, Negative Electrode Current Collector, and Negative Electrode Active Substance>

The negative electrode is not particularly limited and may be appropriately selected in accordance with the intended purpose so long as the negative electrode has a negative electrode material on a negative electrode current collector.

The shape of the negative electrode is not particularly limited and may be appropriately selected in accordance with the intended purpose. Examples of the shape of the negative electrode include a flat plate shape and a sheet shape.

For example, the shape, structure, size, and material of the negative electrode current collector are not particularly limited and may be appropriately selected in accordance with the intended purpose.

Examples of the shape of the negative electrode current collector include a foil shape.

Examples of the material of the negative electrode current collector include stainless steel, nickel, aluminum, copper, titanium, and tantalum. Among these materials, copper is preferable.

The negative electrode material is not particularly limited and may be appropriately selected in accordance with the intended purpose. Examples of the negative electrode material include a negative electrode material containing at least a negative electrode active substance and containing a conducting agent and a binder resin as needed.

The negative electrode active substance is not particularly limited and may be appropriately selected in accordance with the intended purpose. Examples of the negative electrode active substance include carbon materials such as carbon black, graphite, carbon fiber, carbides of metals, organic substances, and carbides of organic substances, titanate, and silicon, or composite materials thereof.

A carbon material serving as the negative electrode active substance acts as a reductant in the thermal treatment, and can promote purification of cobalt and nickel as metals.

<Exterior Container>

The material of the exterior container (housing) of the lithium ion secondary battery is not particularly limited and may be appropriately selected in accordance with the intended purpose. Examples of the material of the exterior container include aluminum, resins (plastics), stainless steel, iron, and other alloys.

EXAMPLES

The present invention will be described below by way of Examples. The present invention should not be construed as being limited to these Examples.

Example 1

A used battery pack (295 kg) of lithium ion secondary batteries for vehicles was prepared as a process target raw material (target sample). The positive electrode material contained in the batteries was a ternary system positive electrode active substance having a composition ($LiNi_xCo_yMn_zO_2$ (x+y+z=1), x=0.33, y=0.33, z=0.33). The negative electrode active substance was carbon. An iron exterior case of the battery pack was used as an oxygen shielding container.

The target in the state as above (i.e., wholly) was thermally treated at 750 °C for 1 hour using a burner-type fixed-bed furnace (industrial furnace). The thermally treated product was pulverized using a hammer crusher (obtained from Makino Mfg. Co., Ltd., HC-20), and subsequently classified using a 1.2 mm vibrating sieve, to thereby recover an undersize fine-grained product (60 kg). As a result of analyzing the composition of the fine-grained product, cobalt accounted for 12% by mass, nickel accounted for 12% by mass, and manganese accounted for 11% by mass of the composition of the fine-grained product.

Figure 2:
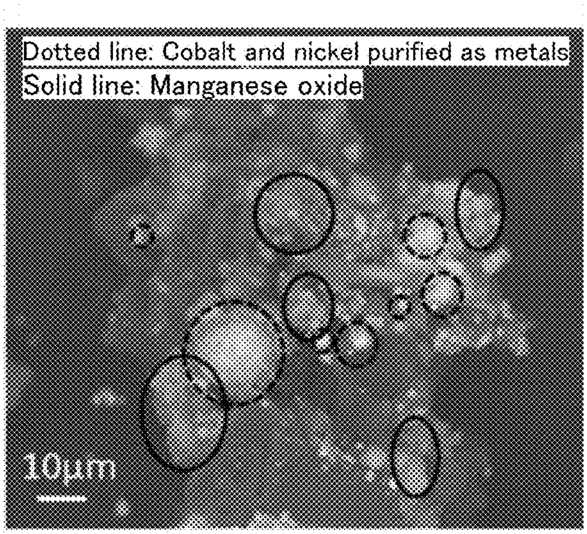
FIG. 2 is a SEM image representing another example of a part of a fine-grained product (containing a positive electrode material) obtained by thermally treating, pulverizing, and sieving a ternary system lithium ion secondary battery containing cobalt, nickel, and manganese in Example of the present invention.

FIG. 1 and FIG. 2 illustrate scanning electron microscopic (SEM) images of the fine-grained product. In FIG. 1, the portions appearing as bright (white) dot shapes in the regions enclosed by circles were cobalt and nickel purified as metals. As illustrated in FIG. 1, at this stage, fine grains of cobalt and nickel purified as metals were observed on the surface of the positive electrode material particles. Moreover, at this stage, the diameter of the particles of cobalt and nickel purified as metals was small, and most particles were less than 1 μm. FIG. 2 is a SEM image of a coarse-grained product captured in a different field of view from FIG. 1, and cobalt and nickel purified as metals were distributed in the regions enclosed by dotted lines and manganese oxide was distributed in the regions enclosed by solid lines. As illustrated in FIG. 1 and FIG. 2, it was confirmed that particles of cobalt and nickel were present in the fine-grained product in the form of particles separated from manganese oxide.

In Example 1, the atmosphere in the burner type fixed-bed furnace was an oxidizing atmosphere, but the atmosphere in the exterior case was a reducing atmosphere because the iron exterior case of the battery pack was used as the oxygen shielding container without being removed and carbon used as the negative electrode active substance of the lithium ion secondary batteries served as a reductant. In Example 1, the thermal treatment was performed under a condition that the amount of carbon serving as the reductant was 135% by mass relative to the total amount of cobalt and nickel contained in the lithium ion secondary batteries.

Next, the obtained fine-grained product was partially collected and thermally treated (further thermally treated) at 1,000 °C for 1 hour in a reducing atmosphere (i.e., under a condition in a capped container in the presence of the reductant carbon derived from the negative electrode active substance), to obtain a further thermally treated product. The thermal treatment was performed under a condition that the amount of carbon contained in the fine-grained product was 135% by mass relative to the total amount of cobalt and nickel contained in the lithium ion secondary batteries. As a result, it was confirmed that fine grains of cobalt and nickel purified as metals that had been contained in the fine-grained product became granular aggregates.

Figure 3A:
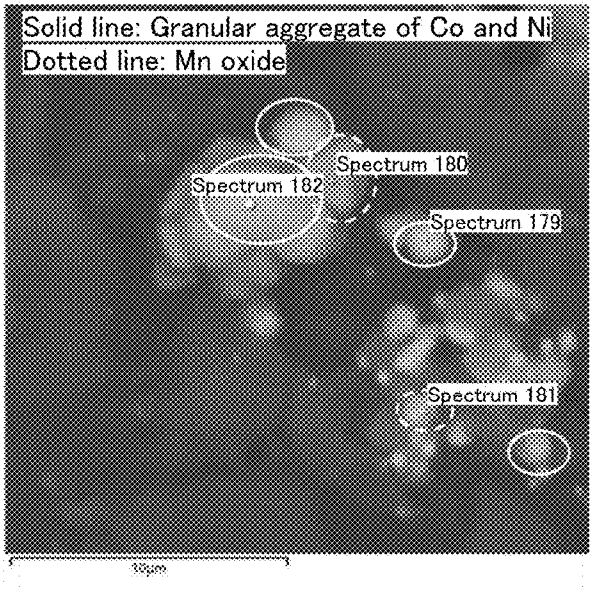
FIG. 3A is a SEM image representing an example of a part of a product obtained by further thermally treating a fine-grained product (containing a positive electrode material) at 1,000 °C in a state in which carbon is present, the fine-grained product being obtained by thermally treating, pulverizing, and sieving a ternary system lithium ion secondary battery containing cobalt, nickel, and manganese in Example of the present invention.

That is, the regions (solid lines) appearing bright and white and the regions (dotted lines) appearing gray, which were both illustrated in the scanning electron microscopic (SEM) image of FIG. 3A, were each partially collected and subjected to an elemental analysis by EDS (energy dispersive X-ray spectrometer).

Figure 3B:
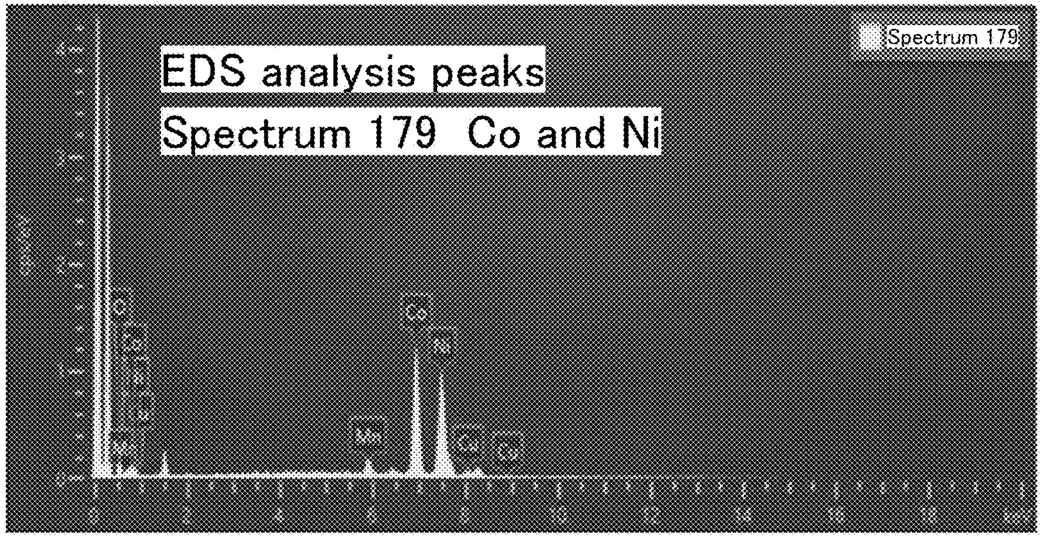
FIG. 3B is a graph plotting elemental peaks obtained by EDS (energy dispersive X-ray spectrometer AZ TECONE available from Oxford Instruments, Inc.) from granular aggregates contained in an example of a product obtained by further thermally treating a fine-grained product (containing a positive electrode material) at 1,000 °C in a state in which carbon is present, the fine-grained product being obtained by thermally treating, pulverizing, and sieving a ternary system lithium ion secondary battery containing cobalt, nickel, and manganese in Example of the present invention, where all elemental peaks by EDS in the drawings of the present invention are obtained by the same device.
Figure 3C:
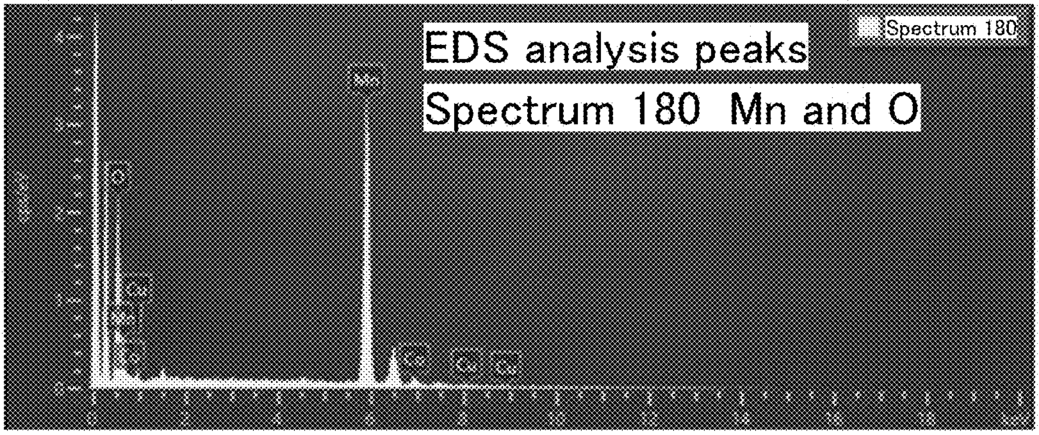
FIG. 3C is a graph plotting elemental peaks obtained by EDS (energy dispersive X-ray spectrometer) from a manganese oxide contained in an example of a product obtained by further thermally treating a fine-grained product (containing a positive electrode material) at 1,000 °C in a state in which carbon is present, the fine-grained product being obtained by thermally treating, pulverizing, and sieving a ternary system lithium ion secondary battery containing cobalt, nickel, and manganese in Example of the present invention.

As a result, it was revealed that plenty of cobalt and nickel were contained in the regions enclosed by the solid lines, judging from the peaks obtained in a spectrum 179 as illustrated in FIG. 3B. On the other hand, it was revealed that plenty of manganese and oxygen were contained in the regions enclosed by the dotted lines, judging from the peaks obtained in a spectrum 180 as illustrated in FIG. 3C.

Hence, it can be seen that granular aggregates of purified metals mainly formed of cobalt and nickel were formed in the regions enclosed by the solid lines in FIG. 3A, and that manganese oxide attributable to manganese and oxygen was formed in the regions enclosed by the dotted lines in FIG. 3A. It can also be seen that the granular aggregates had grown to aggregates of about from 1 μm through 10 μm in the electron microscopic image illustrated in FIG. 3A.

Figure 3D:
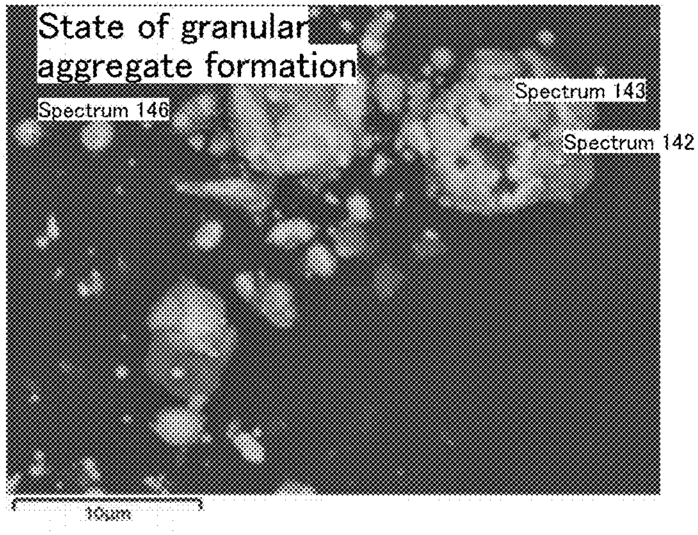
FIG. 3D is a SEM image representing a state of granular aggregate formation when one hour has passed during 2 hours of a further thermal treatment in Example of the present invention.

FIG. 3D illustrates a SEM image representing a state observed after the thermal treatment for 1 hour. It was confirmed that granular aggregates were also formed by the thermal treatment for 1 hour.

Next, the further thermally treated product obtained by the further thermal treatment was subjected to wet magnetic sorting using a drum-shaped magnetic sorter (obtained from Eriez Magnetics Japan Co., Ltd., WDL8 laboratory model) at a magnetic flux density of 1,500 G (0.15 tesla) at a drum rotation number of 30 rpm at a solid-liquid ratio of 10% at a slurry feeding rate of 2 L/min, to recover a slurry of magnetically attractable materials and a slurry of non-magnetically attractable materials. In the wet magnetic sorting of the further thermally treated product, a dispersant was added to the slurry of the further thermally treated product by about 6% relative to the amount of carbon, and the further thermally treated product was subjected to a particle dispersion treatment by ultrasonic waves.

As a result, it was confirmed that granular aggregates containing cobalt and nickel purified as metals were obtained as the magnetically attractable materials. It was confirmed that, for example, manganese oxide was separated into the non-magnetically attractable materials.

Figure 4A:
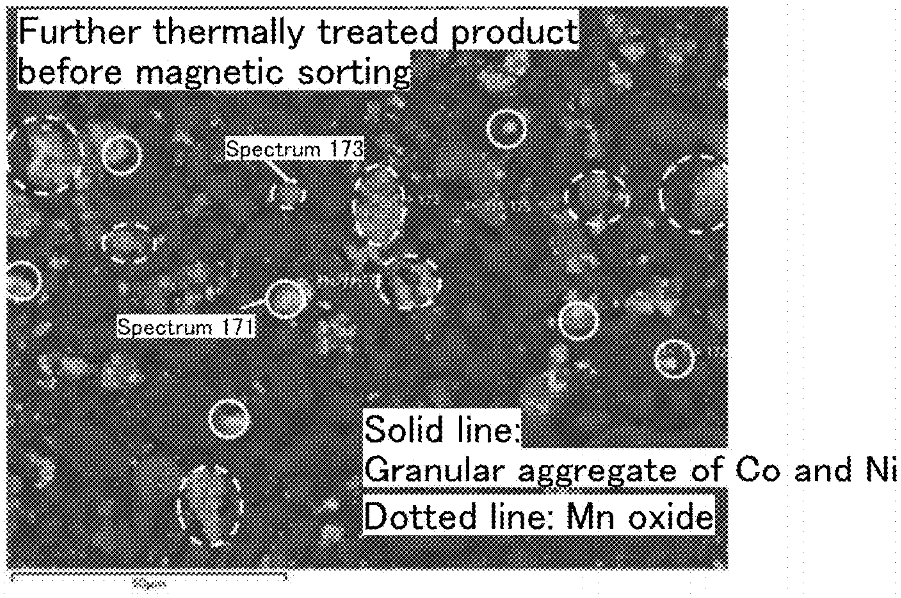
FIG. 4A is a SEM image representing an example of a fine-grained product before wet magnetic sorting in Example of the present invention.

FIG. 4A illustrates a scanning electron microscopic (SEM) image of the fine-grained product before wet magnetic sorting. In FIG. 4A, it was confirmed that the regions enclosed by solid lines were granular aggregates of cobalt and nickel, and the regions enclosed by dotted lines were manganese oxide.

That is, the regions (solid lines) appearing bright and white and the regions (dotted lines) appearing gray and dark, both of which were illustrated in the electron microscopic image of FIG. 4A, were each partially collected and subjected to an elemental analysis by EDS.

Figure 4B:
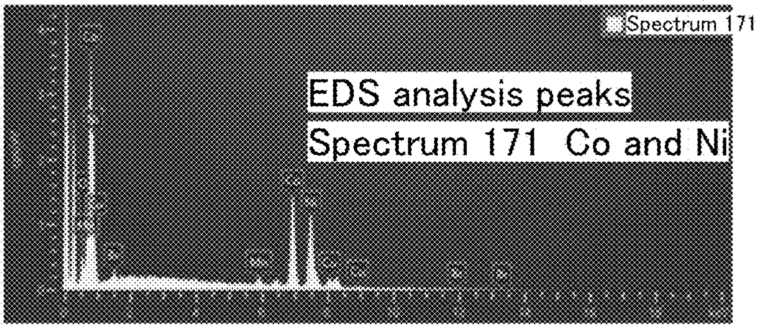
FIG. 4B is a graph plotting elemental peaks obtained by EDS (energy dispersive X-ray spectrometer) from an example of a fine-grained product before wet magnetic sorting in Example of the present invention.
Figure 4C:
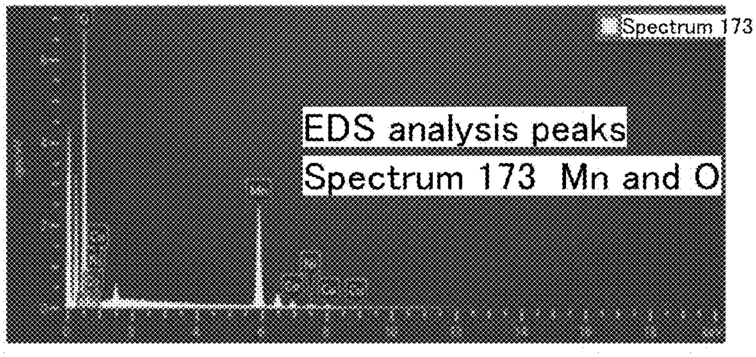
FIG. 4C is a graph plotting elemental peaks obtained by EDS (energy dispersive X-ray spectrometer) from an example of a fine-grained product before wet magnetic sorting in Example of the present invention.

As a result, it was revealed that the regions enclosed by the solid lines were granular aggregates of cobalt and nickel, judging from the peaks obtained in a spectrum 171 as illustrated in FIG. 4B. On the other hand, it was revealed that the regions enclosed by the dotted lines were manganese oxide, judging from the peaks obtained in a spectrum 173 as illustrated in FIG. 4C. It could be inferred that the particles that were darker than the dotted line regions in the electron microscopic image were carbon.

Figure 5A:
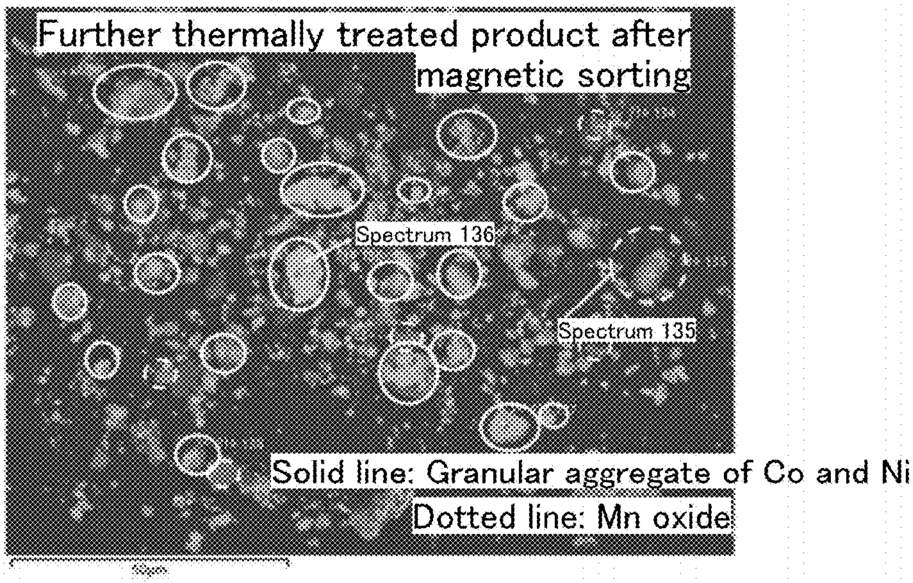
FIG. 5A is a SEM image representing an example of a fine-grained product after wet magnetic sorting in Example of the present invention.

FIG. 5A illustrates a scanning electron microscopic (SEM) image of the fine-grained product after the wet magnetic sorting. In FIG. 5A, it was confirmed that the regions enclosed by solid lines were granular aggregates of cobalt and nickel, and the regions enclosed by dotted lines were manganese oxide.

That is, the regions (solid lines) appearing bright and white and the regions (dotted lines) appearing gray and dark, both of which were illustrated in the electron microscopic image of FIG. 5A, were each partially collected and subjected to an elemental analysis by EDS.

Figure 5B:
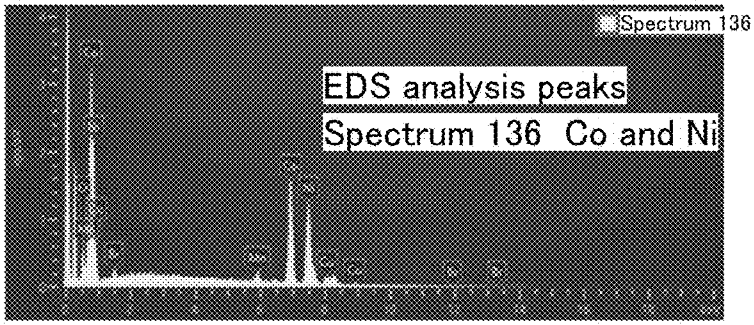
FIG. 5B is a graph plotting elemental peaks obtained by EDS (energy dispersive X-ray spectrometer) from an example of a fine-grained product after wet magnetic sorting in Example of the present invention.
Figure 5C:
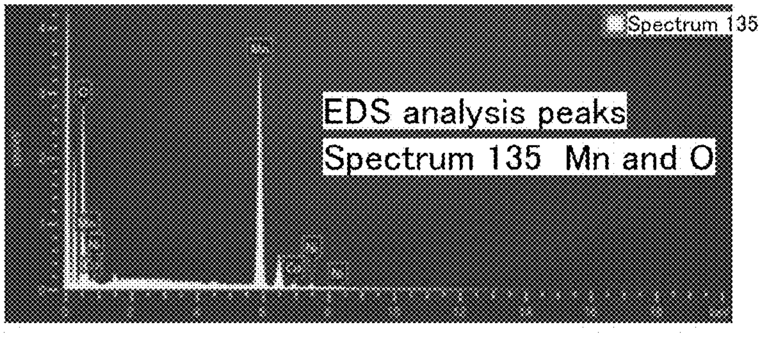
FIG. 5C is a graph plotting elemental peaks obtained by EDS (energy dispersive X-ray spectrometer) from an example of a fine-grained product after wet magnetic sorting in Example of the present invention.

As a result, it was revealed that the regions enclosed by the solid lines were granular aggregates of cobalt and nickel, judging from the peaks obtained in a spectrum 136 as illustrated in FIG. 5B. On the other hand, it was revealed that the regions enclosed by the dotted lines were manganese oxide, judging from the peaks obtained in a spectrum 135 as illustrated in FIG. 5C. It could be inferred that the particles that were darker than the dotted line regions in the electron microscopic image were carbon.

It can be seen from the foregoing that granular aggregates of cobalt and nickel, and manganese oxide were both observed with almost the same frequency in the fine grains before the magnetic sorting as illustrated in FIG. 4A, whereas the ratio of manganese oxide decreased through the magnetic sorting and the ratio of granular aggregates of cobalt and nickel increased from before the magnetic sorting as illustrated in FIG. 5A.

Hence, in Example 1 of the present invention, cobalt and nickel purified as metals were successfully concentrated from the lithium ion secondary batteries.

Example 2

In Example 2, concentrates of cobalt and nickel were obtained in the same manner as in Example 1, except that the further thermally treated product was further pulverized (more finely pulverized), and subsequently subjected to wet magnetic sorting.

More specifically, in Example 2, particles, which were aggregates of metals and oxides in the fine-grained product, were more finely pulverized using a vibrating mill (obtained from Retsch GmbH, RS200). The cumulative 50% volume-based particle diameter $D_{50}$ of the more finely pulverized product obtained by the more finely pulverizing was 3.9 μm.

By the more finely pulverizing, it was possible to separate cobalt and nickel metals, and manganese oxide more accurately into individual bodies. Separation into individual bodies represents individually separately existing states of cobalt and nickel metal particles and manganese oxide particles.

Figure 6A:
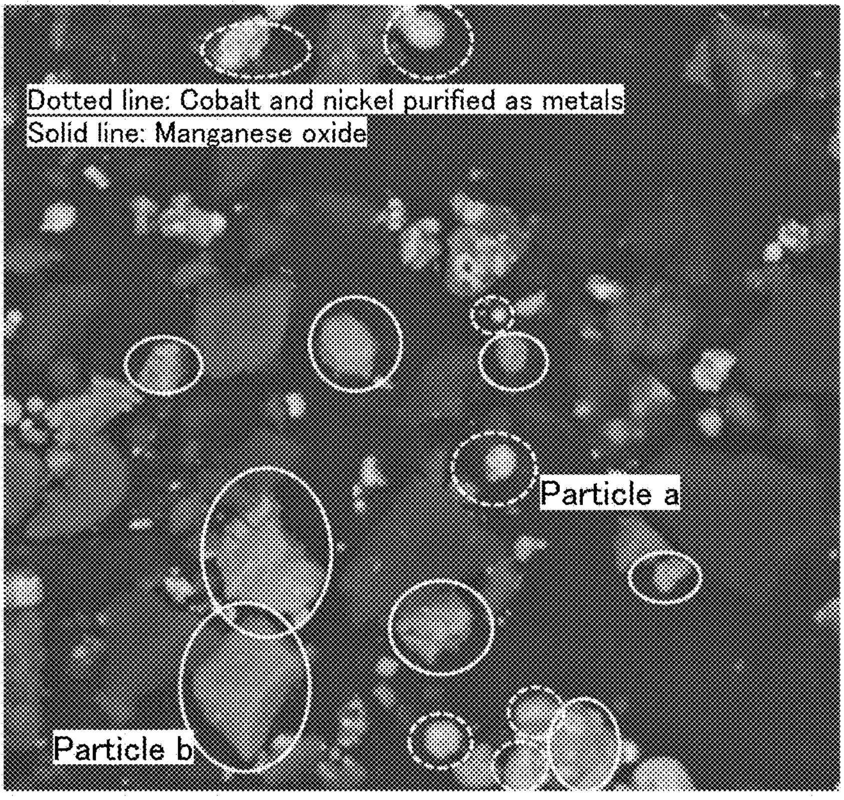
FIG. 6A is a SEM image representing an example of a product obtained by more finely pulverizing particles, which are aggregates of metals and oxides, in Example of the present invention.

FIG. 6A illustrates a SEM image of an example of the more finely pulverized product of the particles, which were aggregates of metals and oxides in the fine-grained product. In FIG. 6A, particles a of cobalt and nickel purified as metals were distributed in the regions enclosed by dotted lines, and particles b of manganese oxide were distributed in the regions enclosed by solid lines.

Figure 6B:
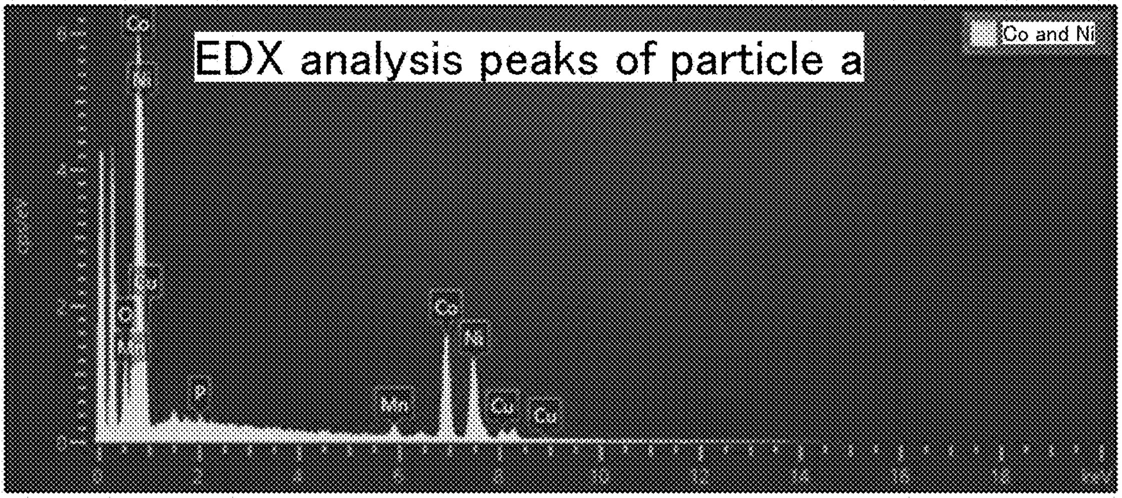
FIG. 6B is a graph plotting elemental peaks obtained by an elemental analysis by EDS (energy dispersive X-ray spectrometer) performed by collecting some of particles a in which cobalt and nickel of FIG. 6A are purified as metals as metals in Example of the present invention.
Figure 6C:
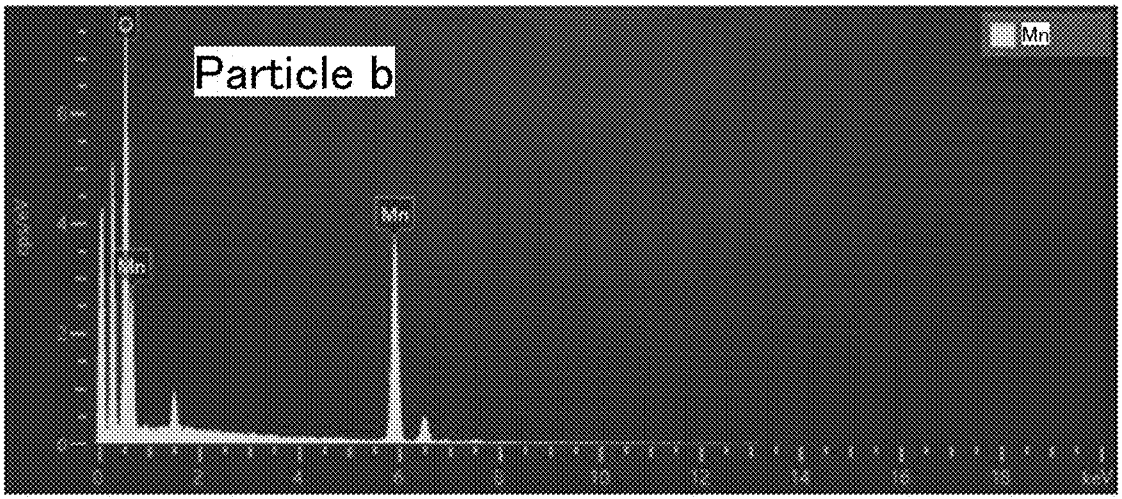
FIG. 6C is a graph plotting elemental peaks obtained by an elemental analysis by EDS (energy dispersive X-ray spectrometer) performed by collecting some of particles a in which cobalt and nickel of FIG. 6A are purified as metals in Example of the present invention.

FIG. 6B is a graph plotting the result of an element analysis by EDS, performed by collecting some of the particles a in which cobalt and nickel of FIG. 6A were purified as metals. FIG. 6C is a graph plotting the result of an element analysis by EDS (energy dispersive X-ray spectrometer), performed by collecting some of the particles b of manganese oxide of FIG. 6A.

As plotted in FIG. 6B and FIG. 6C, it was confirmed that cobalt and nickel were concentrated in the particles a in which cobalt and nickel were purified as metals, and manganese oxide was concentrated in the particles b of manganese oxide.

In Example 2, the wet magnetic sorting was performed using a drum-shaped magnetic sorter in the same manner as in Example 1, to recover magnetically attractable materials and a slurry of non-magnetically attractable materials. Granular aggregates containing cobalt and nickel purified as metals were recovered as the magnetically attractable materials, and, for example, manganese oxide was recovered as the non-magnetically attractable materials.

Example 3

In Example 3, a battery pack of lithium ion secondary batteries was thermally treated, pulverized, and sieved in the same manner as in Example 1, to obtain a fine-grained product as an undersize product. Next, in Example 3, the obtained fine-grained product was subjected to wet magnetic sorting (first, wet magnetic sorting before further thermal treatment) under the same conditions as in Example 1, to obtain magnetically attractable materials. In Example 3, the obtained magnetically attractable materials were further thermally treated under the same conditions as in Example 1, and the thermally treated product obtained by the further thermal treatment was further subjected to wet magnetic sorting (second, corresponding to the wet magnetic sorting in Examples 1 and 2), to obtain magnetically attractable materials. In the second wet magnetic sorting, magnetically attractable materials and a slurry of non-magnetically attractable materials were sorted from each other using a drum-shaped magnetic sorter under the same conditions as in Example 1. As a result of analyzing the obtained magnetically attractable materials, cobalt and nickel were concentrated in the magnetically attractable materials.

The grades of cobalt, nickel, and manganese in the magnetically attractable materials and the non-magnetically attractable materials obtained by the second wet magnetic sorting, and the recovery rates of cobalt, nickel, and manganese by the wet magnetic sorting in Example 3 are presented in Table 1.

Example 4

In Example 4, concentrates of cobalt and nickel (magnetically attractable materials by second wet magnetic sorting) were obtained in the same manner as in Example 3, except that the temperature of the further thermal treatment was set to 850 °C, and the further thermally treated product was more finely pulverized under the same conditions as in Example 2. The grades of cobalt, nickel, and manganese in the magnetically attractable materials and the non-magnetically attractable materials obtained by the second wet magnetic sorting, and the recovery rates of cobalt, nickel, and manganese by the wet magnetic sorting in Example 4 are presented in Table 1.

The state of the magnetically attractable materials by the second wet magnetic sorting in Example 3 and the state of the magnetically attractable materials by the second wet magnetic sorting in Example 4 were compared by SEM observation. As a result, in Example 3, granular aggregates of cobalt and nickel that had grown by the further thermal treatment and manganese oxide were observed to be present in an aggregated state in rather many portions. On the other hand, in Example 4, by pulverizing the further thermally treated product, it was possible to sufficiently resolve the physically aggregated state of cobalt and nickel metals and manganese oxide. From this fact, it was revealed that Example 4 was better than Example 3 in separability between cobalt and nickel, and manganese by the wet magnetic sorting. That is, Example 4 was able to recover more cobalt and nickel in the magnetically attractable materials and recover more manganese in the non-magnetically attractable materials than Example 3.

Examples 5 to 7

In Examples 5 to 7, concentrates of cobalt and nickel were obtained in the same manner as in Example 4, except that the temperature (850 °C or 1,000 °C) of the further thermal treatment and the time (1 hour or 4 hours) of the further thermal treatment were changed to the temperature and time conditions presented in Table 1. The grades of cobalt, nickel, and manganese in the magnetically attractable materials and the non-magnetically attractable materials obtained by the second wet magnetic sorting, and the recovery rates of cobalt, nickel, and manganese by the wet magnetic sorting in Examples 5 to 7 are presented in Table 1. From the results of Examples 5 to 7, it was found preferable to set a higher temperature and a longer thermal treatment time for the further thermal treatment.

Examples 8 and 9

In Example 8, concentrates of cobalt and nickel were obtained in the same manner as in Example 4, except that the fine-grained product, which was the undersize product, was not further thermally treated.

In Example 9, concentrates of cobalt and nickel were obtained in the same manner as in Example 4, except that the fine-grained product, which was the undersize product, was not subjected to the further thermal treatment and more finely pulverizing by a vibrating mill.

The grades of cobalt, nickel, and manganese in the magnetically attractable materials and the non-magnetically attractable materials obtained by the second wet magnetic sorting, and the recovery rates of cobalt, nickel, and manganese by the wet magnetic sorting in Examples 8 and 9 are presented in Table 1. From the results of 4, 8, and 9, it was confirmed that the recovery rates and the grades of cobalt and nickel in the magnetically attractable materials were better improved by the further thermal treatment. It was also confirmed that more finely pulverizing by, for example, a vibrating mill was also effective for improving the recovery rates and the grades of cobalt and nickel in the magnetically attractable materials. From the results described above, it was confirmed to be preferable to perform the further thermal treatment and the more finely pulverizing in combination in the present invention.

Example 10

In Example 10, a positive electrode material (a ternary system positive electrode material reagent ($LiNi_xCo_yMn_zO_2$ (x+y+z=1), x=0.33, y=0.33, z=0.33) used in a lithium ion secondary battery) was processed as the target, in order to confirm whether it would be possible to concentrate cobalt and nickel and separate manganese in the same manner as in Examples described above also from the positive electrode material product of a lithium ion secondary battery or a rejected lot of a positive electrode material discarded in the production process of lithium ion secondary batteries.

In Example 10, first, carbon was added to the positive electrode material described above, and the resultant was subjected to thermal treatment (corresponding to the further thermal treatment in Examples 1 to 10) at 1,000 °C for 1 hour in a reducing atmosphere (i.e., under a condition in a capped container in the presence of carbon serving as a reductant). In Example 10, the positive electrode material after the thermal treatment was observed. As a result, it was confirmed that granular aggregates of cobalt and nickel metals were formed.

Then, in Example 10, the positive electrode material after the thermal treatment was subjected to wet magnetic sorting (sorting into magnetically attractable materials and a slurry of non-magnetically attractable materials using a drum-shaped magnetic sorter) in the same manner as in Example 2. Then, the obtained magnetically attractable materials were observed. As a result, it was confirmed that cobalt and nickel were concentrated in the magnetically attractable materials.

Examples 11 to 14

In Examples 11 to 14, a lithium ion secondary battery pack containing LMO (a manganese-based positive electrode material containing lithium manganate) as the positive electrode material was used as the process target.

In Example 11, concentrates of cobalt and nickel were obtained in the same manner as in Example 9, except that an undersize fine-grained product of a pulverized product of the lithium ion secondary battery pack after a thermal treatment was not subjected to wet magnetic sorting (the first wet magnetic sorting in Example 9), and a particle dispersion treatment by ultrasonic waves was not performed and a dispersant was not added in the wet magnetic sorting of a further thermally treated product obtained by a further thermal treatment.

In Example 12, concentrates of cobalt and nickel were obtained in the same manner as in Example 9, except that an undersize fine-grained product of a pulverized product of the lithium ion secondary battery pack after a thermal treatment was not subjected to wet magnetic sorting (the first wet magnetic sorting in Example 9), and a particle dispersion treatment by ultrasonic waves was not performed in the wet magnetic sorting of a further thermally treated product obtained by a further thermal treatment.

In Example 13, concentrates of cobalt and nickel were obtained in the same manner as in Example 9, except that an undersize fine-grained product of a pulverized product of the lithium ion secondary battery pack after a thermal treatment was not subjected to wet magnetic sorting (the first wet magnetic sorting in Example 9), and a dispersant was not added in the wet magnetic sorting of a further thermally treated product obtained by a further thermal treatment.

In Example 14, concentrates of cobalt and nickel were obtained in the same manner as in Example 9, except that an undersize fine-grained product of a pulverized product of the lithium ion secondary battery pack after a thermal treatment was not subjected to wet magnetic sorting (the first wet magnetic sorting in Example 9).

Based on the results of Examples 11 to 14, how the particle dispersion treatment by ultrasonic waves and addition of a dispersant were each influential on the grades of cobalt and nickel obtained by the wet magnetic sorting was evaluated. The grades of cobalt, nickel, and manganese in the magnetically attractable materials and the non-magnetically attractable materials obtained by the wet magnetic sorting, and the recovery rates of cobalt, nickel, and manganese by the wet magnetic sorting in Examples 11 to 14 are presented in Table 1. From the results, it was confirmed to be preferable to use ultrasonic waves and a dispersant in combination in order to increase the grades of cobalt and nickel obtained by the wet magnetic sorting.

Example 15

In Example 15, concentrates of cobalt and nickel were obtained in the same manner as in Example 14, except that an undersize fine-grained product of a pulverized product obtained by pulverizing and classifying a thermally treated product obtained by a thermal treatment was more finely pulverized with a vibrating mill under the same conditions as in Example 8.

The grades of cobalt, nickel, and manganese in the magnetically attractable materials and the non-magnetically attractable materials obtained by the wet magnetic sorting, and the recovery rates of cobalt, nickel, and manganese by the wet magnetic sorting in Example 15 are presented in Table 1. Example 15 was better than Example 14 in the grades of cobalt and nickel in the magnetically attractable materials.

Example 16

In Example 16, concentrates of cobalt and nickel were obtained in the same manner as in Example 7, except that a lithium ion secondary battery pack containing LMO as the positive electrode material was used as the process target, and an undersize fine-grained product of a pulverized product of the lithium ion secondary battery pack after a thermal treatment was not subjected to wet magnetic sorting (the first wet magnetic sorting in Example 7).

The grades of cobalt, nickel, and manganese in the magnetically attractable materials and the non-magnetically attractable materials obtained by the wet magnetic sorting, and the recovery rates of cobalt, nickel, and manganese by the wet magnetic sorting in Example 16 are presented in Table 1. Example 16 was the highest among Examples 11 to 15 in the grades of cobalt and nickel. From this result, it was found preferable to concentrate cobalt and nickel by, as in Example 7, performing the further thermal treatment in a reducing atmosphere, subsequently performing the more finely pulverizing by a vibrating mill, and subsequently subjecting the more finely pulverized thermally treated product to wet magnetic sorting in which a particle dispersion treatment by ultrasonic waves was performed and a dispersant was used.

Examples 17 and 18

In Example 17, a lithium ion secondary battery pack containing LMO as the positive electrode material was thermally treated and pulverized under the same conditions as in Example 1, and cobalt and nickel-containing dust generated during the pulverization and then collected was more finely pulverized using a vibrating mill and subsequently subjected to wet magnetic sorting in the same manner as in Example 1, to obtain concentrates of cobalt and nickel.

In Example 18, the further thermal treatment and the subsequent processes were performed in the same manner as in Example 2, except that a lithium ion secondary battery pack containing LMO as the positive electrode material was thermally treated and pulverized under the same conditions as in Example 1, and cobalt and nickel-containing dust generated during the pulverization and then collected was further thermally treated for a further thermal treatment time of 4 hours, to obtain concentrates of cobalt and nickel.

The grades of cobalt, nickel, and manganese in the magnetically attractable materials and the non-magnetically attractable materials obtained by the wet magnetic sorting, and the recovery rates of cobalt, nickel, and manganese by the wet magnetic sorting in Examples 17 and 18 are presented in Table 1. From these results, it was confirmed that cobalt and nickel metals were also contained in the collected dust generated during the pulverization, and that it was possible to concentrate these cobalt and nickel metals. It was also confirmed to be possible to grow granular aggregates of cobalt and nickel large by the further thermal treatment and to better concentrate cobalt and nickel.

Referential Example 1

In Referential Example 1, the same processes as in Example 10 were performed except that the thermal treatment was performed in an oxidizing atmosphere, and whether or not cobalt and nickel metals were produced was confirmed. A fine-grained product after the thermal treatment was observed with an X-ray diffractometer (obtained from Rigaku Corporation, ULTIMA IV). As a result, a peak of only $LiNi_xCo_yMn_zO_2$ (x+y+z=1), x=0.33, y=0.33, z=0.33) was observed, and peaks of cobalt and nickel metals were not observed. That is, it was confirmed that cobalt and nickel were in an oxidized state and remained unchanged from oxides, and no metal granular aggregates that could be magnetically sorted were formed.

Figure 7:
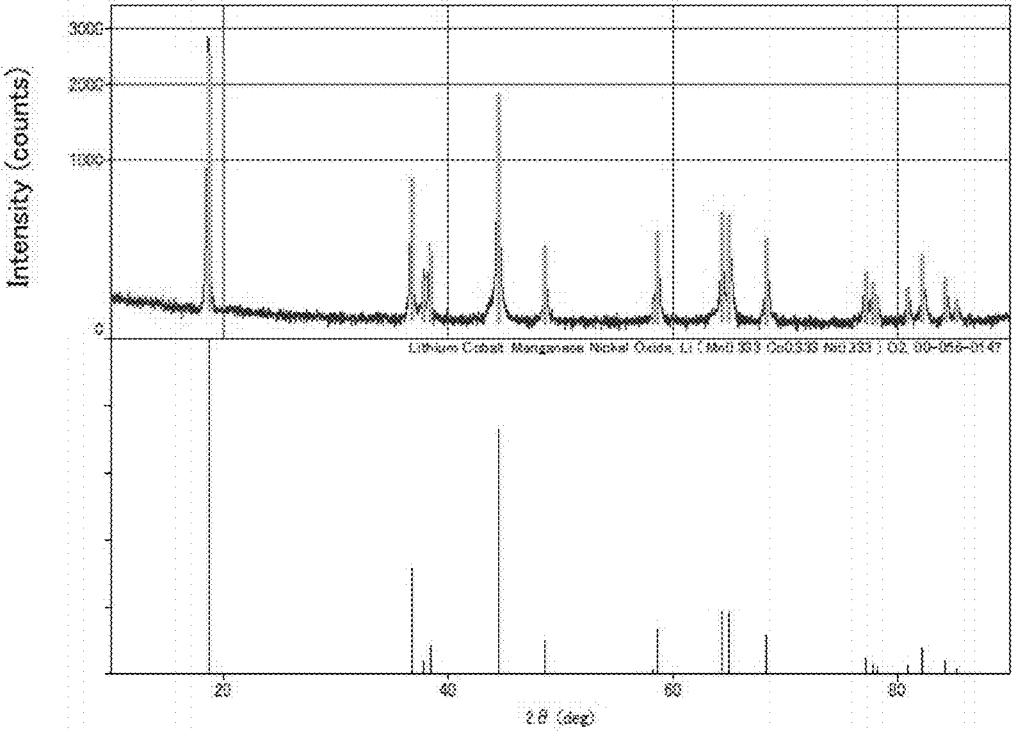
FIG. 7 is a graph plotting an example of X-ray diffraction peaks indicating that cobalt and nickel fail to be formed into metals but are maintained in the form of positive electrode material oxides in Referential Example 1.

FIG. 7 plots X-ray diffraction peaks (spectra) indicating that cobalt and nickel were not formed into metals in Referential Example 1, but remained unchanged from the positive electrode material oxide form.

Referential Example 2

In Referential Example 2, the same processes as in Example 10 were performed except that the thermal treatment temperature in the thermal treatment was set to 550 °C, and whether or not cobalt and nickel metals were produced was confirmed. A fine-grained product after the thermal treatment was observed with an X-ray diffractometer (obtained from Rigaku Corporation, ULTIMA IV). As a result, a peak of $LiNi_xCo_yMn_zO_2$ (x+y+z=1), x=0.33, y=0.33, z=0.33) and a peak of carbon were observed, and peaks of cobalt and nickel metals were not observed. That is, it was confirmed that no (or almost no) metal granular aggregates that could be magnetically sorted were formed.

Figure 8:
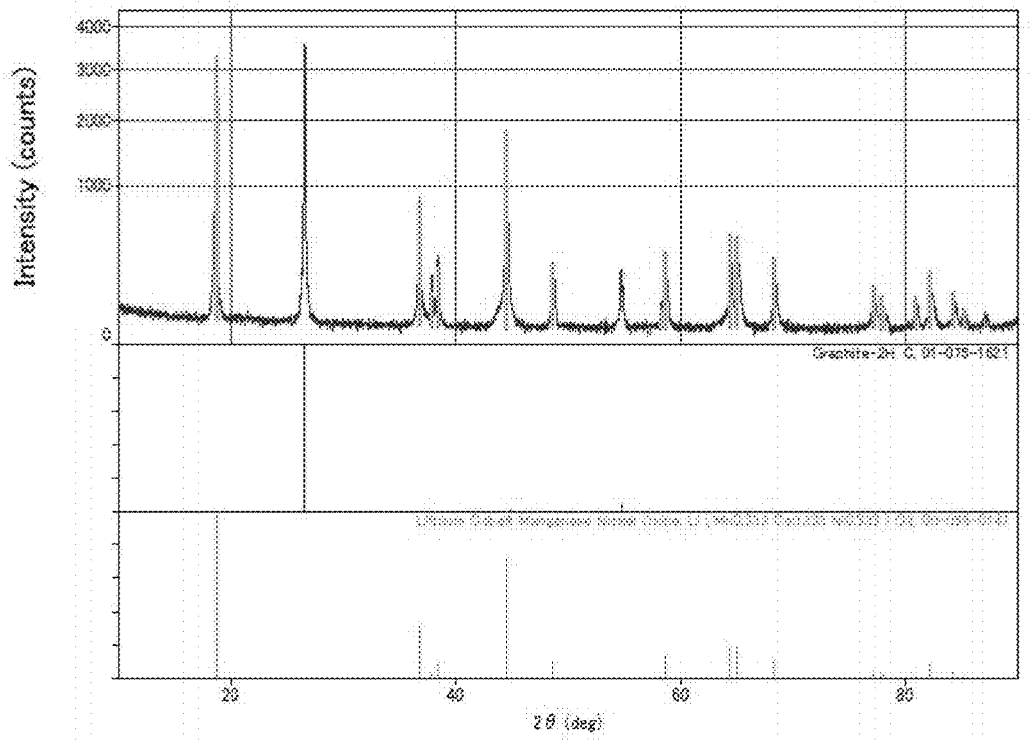
FIG. 8 is a graph plotting an example of X-ray diffraction peaks indicating that cobalt and nickel fail to be formed into metals but are maintained in the form of positive electrode material oxides in Referential Example 2.

FIG. 8 plots X-ray diffraction peaks (spectra) indicating that cobalt and nickel were not formed into metals in Referential Example 2, but remained unchanged from the positive electrode material oxide form.

TABLE 1

| | Grade (% by mass) | | | | | | | | | | | | Recovery rate | | | |
|---|---|---|---|---|---|---|---|---|---|---|---|---|---|---|---|---|
| | Target before wet magnetic sorting | | | | Magnetically attractable materials after wet magnetic sorting | | | | Non-magnetically attractable materials after wet magnetic sorting | | | | | | | |
| | Co | Ni | Mn | C | Co | Ni | Mn | C | Co | Ni | Mn | C | Co | Ni | Mn | C |
| Ex. 1 | No analysis value | | | | | | | | | | | | | | | |
| Ex. 2 | | | | | | | | | | | | | | | | |
| Ex. 3 | 22.0 | 22.2 | 20.0 | 4.6 | 23.0 | 23.2 | 20.9 | 1.1 | 6.7 | 6.4 | 6.4 | 59.3 | 98.1 | 98.2 | 98.1 | 22.0 |
| Ex. 4 | 22.5 | 23.1 | 19.3 | 6.9 | 27.6 | 28.4 | 20.2 | 0.5 | 6.7 | 6.7 | 16.8 | 26.5 | 92.7 | 92.9 | 78.8 | 5.5 |
| Ex. 5 | 22.6 | 23.1 | 20.4 | 5.4 | 26.0 | 26.7 | 20.7 | 1.0 | 7.4 | 7.3 | 19.0 | 24.9 | 93.9 | 94.2 | 82.8 | 15.1 |
| Ex. 6 | 22.0 | 22.7 | 19.9 | 6.7 | 26.2 | 27.0 | 19.9 | 1.7 | 5.6 | 5.5 | 20.0 | 26.4 | 94.8 | 95.1 | 79.7 | 20.2 |
| Ex. 7 | 22.6 | 23.0 | 20.2 | 2.9 | 29.6 | 30.3 | 17.8 | 0.0 | 9.8 | 9.6 | 24.7 | 8.3 | 84.7 | 85.3 | 56.9 | 0.0 |
| Ex. 8 | 19.0 | 20.9 | 18.6 | 11.6 | 22.3 | 24.7 | 21.2 | 5.0 | 10.8 | 11.8 | 12.3 | 27.6 | 83.4 | 83.6 | 80.7 | 30.5 |
| Ex. 9 | 19.0 | 20.5 | 18.9 | 7.9 | 20.2 | 22.0 | 20.3 | 4.0 | 15.3 | 15.7 | 14.5 | 20.7 | 81.1 | 82.0 | 82.0 | 38.6 |
| Ex. 10 | 20.2 | 20.6 | 19 | 26.7 | 28 | 28.7 | 23.1 | 5.5 | 4.3 | 4.2 | 10.8 | 69.7 | 92.9 | 93.2 | 81.2 | 13.8 |
| Ex. 11 | 6.6 | 6.6 | 22.8 | 27.3 | 10.2 | 10.6 | 29.2 | 14.5 | 3.6 | 3.6 | 18.6 | 35.7 | 66.8 | 67 | 50.6 | 20.9 |
| Ex. 12 | 6.8 | 6.7 | 24.9 | 27.5 | 11.3 | 11.3 | 33.7 | 8.9 | 2.8 | 2.6 | 17.0 | 44.2 | 78.7 | 79.6 | 64.2 | 15.4 |
| Ex. 13 | 7.1 | 7.0 | 25.2 | 27.3 | 10.9 | 11.0 | 31.5 | 16.3 | 3.7 | 3.6 | 19.7 | 36.8 | 71.5 | 72.0 | 57.7 | 27.4 |
| Ex. 14 | 7.0 | 7.0 | 25.3 | 28.6 | 12.2 | 12.3 | 34.7 | 7.6 | 2.0 | 1.9 | 16.4 | 48.6 | 85.4 | 86.3 | 66.7 | 12.9 |
| Ex. 15 | 6.3 | 6.8 | 22.8 | 24.7 | 13.4 | 15.0 | 24.7 | 18.8 | 3.5 | 3.6 | 22.0 | 27.1 | 60.4 | 62.4 | 30.9 | 21.6 |
| Ex. 16 | 7.1 | 7.3 | 24.2 | 15.4 | 17.3 | 18.0 | 26.0 | 0.0 | 3.6 | 3.6 | 23.6 | 20.7 | 87.2 | 87.1 | 27.5 | 0.0 |
| Ex. 17 | 8.7 | 9.9 | 15.6 | 34.5 | 17.6 | 20.7 | 20.0 | 20.0 | 5.5 | 6.0 | 14.0 | 39.6 | 53.0 | 55.1 | 33.7 | 15.2 |
| Ex. 18 | 10.3 | 11.1 | 16.1 | 27.4 | 23.8 | 26.3 | 16.8 | 4.1 | 5.4 | 5.6 | 15.8 | 35.8 | 86.1 | 88.0 | 27.8 | 3.9 |
| Ref. Ex. 1 | No analysis value | | | | | | | | | | | | | | | |
| Ref. Ex. 2 | | | | | | | | | | | | | | | | |

The process conditions of Examples are collectively presented in Tables 2 to 5 below.

TABLE 2

| | Target sample | Positive electrode material kind | Thermal treatment step for battery cell/pack Temperature (° C.) | Time (h) | Atmosphere | Formation of granular aggregates |
|---|---|---|---|---|---|---|
| Ex. 1 | Battery pack | NCM | 750 | 1 | Reducing atmosphere in battery pack | Formed |
| Ex. 2 | Battery pack | NCM | 750 | 1 | Reducing atmosphere in battery pack | Formed |
| Ex. 3 | Battery pack | NCM | 750 | 1 | Reducing atmosphere in battery pack | Formed |
| Ex. 4 | Battery pack | NCM | 750 | 1 | Reducing atmosphere in battery pack | Formed |
| Ex. 5 | Battery pack | NCM | 750 | 1 | Reducing atmosphere in battery pack | Formed |
| Ex. 6 | Battery pack | NCM | 750 | 1 | Reducing atmosphere in battery pack | Formed |
| Ex. 7 | Battery pack | NCM | 750 | 1 | Reducing atmosphere in battery pack | Formed |
| Ex. 8 | Battery pack | NCM | 750 | 1 | Reducing atmosphere in battery pack | Formed |
| Ex. 9 | Battery pack | NCM | 750 | 1 | Reducing atmosphere in battery pack | Formed |
| Ex. 10 | Positive electrode material reagent | NCM | None | None | None | Formed |
| Ex. 11 | Battery pack | LMO | 750 | 1 | Reducing atmosphere in battery pack | Formed |
| Ex. 12 | Battery pack | LMO | 750 | 1 | Reducing atmosphere in battery pack | Formed |
| Ex. 13 | Battery pack | LMO | 750 | 1 | Reducing atmosphere in battery pack | Formed |
| Ex. 14 | Battery pack | LMO | 750 | 1 | Reducing atmosphere in battery pack | Formed |
| Ex. 15 | Battery pack | LMO | 750 | 1 | Reducing atmosphere in battery pack | Formed |
| Ex. 16 | Battery pack | LMO | 750 | 1 | Reducing atmosphere in battery pack | Formed |
| Ex. 17 | Battery pack | LMO | 750 | 1 | Reducing atmosphere in battery pack | Formed |
| Ex. 18 | Battery pack | LMO | 750 | 1 | Reducing atmosphere in battery pack | Formed |
| Ref. Ex. 1 | Positive electrode material reagent | NCM | 750 | 1 | Oxidizing atmosphere (decomposed) | Not formed |
| Ref. Ex. 2 | Positive electrode material reagent | NCM | 550 (lower than Al melting point) | 1 | Reducing atmosphere in tightly closed container | Not formed |

TABLE 3

| | Pulverizing step, classifying step, and magnetic sorting step for battery pack/cell after thermal treatment | | | | |
|---|---|---|---|---|---|
| | | | | Wet magnetic sorting (first) | |
| | Pulverization (first) | Mesh size for classification | Target of wet magnetic sorting | Separator | Magnetic flux density (tesla) |
| Ex. 1 | Hammer crusher | 1.2 mm | Undersize fine-grained product | None | None |
| Ex. 2 | Hammer crusher | 1.2 mm | Undersize fine-grained product | None | None |
| Ex. 3 | Hammer crusher | 1.2 mm | Undersize fine-grained product | Drum-shaped wet magnetic sorter | 0.15 |
| Ex. 4 | Hammer crusher | 1.2 mm | Undersize fine-grained product | Drum-shaped wet magnetic sorter | 0.15 |
| Ex. 5 | Hammer crusher | 1.2 mm | Undersize fine-grained product | Drum-shaped wet magnetic sorter | 0.15 |
| Ex. 6 | Hammer crusher | 1.2 mm | Undersize fine-grained product | Drum-shaped wet magnetic sorter | 0.15 |
| Ex. 7 | Hammer crusher | 1.2 mm | Undersize fine-grained product | Drum-shaped wet magnetic sorter | 0.15 |
| Ex. 8 | Hammer crusher | 1.2 mm | Undersize fine-grained product | Drum-shaped wet magnetic sorter | 0.15 |
| Ex. 9 | Hammer crusher | 1.2 mm | Undersize fine-grained product | Drum-shaped wet magnetic sorter | 0.15 |
| Ex. 10 | None | None | | None | None |
| Ex. 11 | Hammer crusher | 1.2 mm | Undersize fine-grained product | None | None |
| Ex. 12 | Hammer crusher | 1.2 mm | Undersize fine-grained product | None | None |
| Ex. 13 | Hammer crusher | 1.2 mm | Undersize fine-grained product | None | None |
| Ex. 14 | Hammer crusher | 1.2 mm | Undersize fine-grained product | None | None |
| Ex. 15 | Hammer crusher | 1.2 mm | Undersize fine-grained product | None | None |
| Ex. 16 | Hammer crusher | 1.2 mm | Undersize fine-grained product | None | None |
| Ex. 17 | Hammer crusher | None | Collected dust from pulverization | None | None |

TABLE 3-continued

| | Pulverizing step, classifying step, and magnetic sorting step for battery pack/cell after thermal treatment | | | | |
|---|---|---|---|---|---|
| | | | | Wet magnetic sorting (first) | |
| | Pulverization (first) | Mesh size for classification | Target of wet magnetic sorting | Separator | Magnetic flux density (tesla) |
| Ex. 18 | Hammer crusher | None | Collected dust from pulverization | None | None |
| Ref. Ex. 1 | None | None | | None | None |
| Ref. Ex. 2 | None | None | | None | None |

TABLE 4

| | Further thermal treatment | | |
|---|---|---|---|
| | Temperature (° C.) | Time (h) | Atmosphere |
| Ex. 1 | 1,000 | 1 | Reducing atmosphere (capped container, containing carbon) |
| Ex. 2 | 1,000 | 1 | Reducing atmosphere (capped container, containing carbon) |
| Ex. 3 | 1,000 | 1 | Reducing atmosphere (capped container, containing carbon) |
| Ex. 4 | 850 | 1 | Reducing atmosphere (capped container, containing carbon) |
| Ex. 5 | 850 | 4 | Reducing atmosphere (capped container, containing carbon) |
| Ex. 6 | 1,000 | 1 | Reducing atmosphere (capped container, containing carbon) |
| Ex. 7 | 1,000 | 4 | Reducing atmosphere (capped container, containing carbon) |
| Ex. 8 | None | None | None |

TABLE 4-continued

| | Further thermal treatment | | |
|---|---|---|---|
| | Temperature (° C.) | Time (h) | Atmosphere |
| Ex. 9 | None | None | None |
| Ex. 10 | 1,000 | 1 | Reducing atmosphere (capped container, containing carbon) |
| Ex. 11 | None | None | None |
| Ex. 12 | None | None | None |
| Ex. 13 | None | None | None |
| Ex. 14 | None | None | None |
| Ex. 15 | None | None | None |
| Ex. 16 | 1,000 | 4 | Reducing atmosphere (capped container, containing carbon) |
| Ex. 17 | None | None | None |
| Ex. 18 | 1,000 | 4 | Reducing atmosphere (capped container, containing carbon) |
| Ref. Ex. 1 | None | None | None |
| Ref. Ex. 2 | None | None | None |

TABLE 5

| | Pulverizing step and magnetic sorting step after further thermal treatment | | | | | |
|---|---|---|---|---|---|---|
| | Fine pulverization (second pulverization) | | Wet magnetic sorting (second) | | | |
| | Pulverizer | D50 particle diameter of particles before wet magnetic sorting (μm) | Separator | Magnetic flux density (tesla) | Amount of dispersant | Particle dispersion treatment by ultrasonic waves |
| Ex. 1 | None | 14.1 | Drum-shaped magnetic sorter | 0.15 | From 0.6% through 6% relative to C | Performed |
| Ex. 2 | Vibrating mill | 3.9 | Drum-shaped magnetic sorter | 0.15 | From 0.6% through 6% relative to C | Performed |
| Ex. 3 | None | 14.1 | Drum-shaped magnetic sorter | 0.15 | From 0.6% through 6% relative to C | Performed |
| Ex. 4 | Vibrating mill | 3.9 | Drum-shaped magnetic sorter | 0.15 | From 0.6% through 6% relative to C | Performed |
| Ex. 5 | Vibrating mill | 3.1 | Drum-shaped magnetic sorter | 0.15 | From 0.6% through 6% relative to C | Performed |
| Ex. 6 | Vibrating mill | 3.8 | Drum-shaped magnetic sorter | 0.15 | From 0.6% through 6% relative to C | Performed |
| Ex. 7 | Vibrating mill | 5.2 | Drum-shaped magnetic sorter | 0.15 | From 0.6% through 6% relative to C | Performed |
| Ex. 8 | Vibrating mill | 5.6 | Drum-shaped magnetic sorter | 0.15 | From 0.6% through 6% relative to C | Performed |
| Ex. 9 | None | 15.9 | Drum-shaped magnetic sorter | 0.15 | From 0.6% through 6% relative to C | Performed |
| Ex. 10 | None | None | None | 0.15 | From 0.6% through 6% relative to C | Performed |
| Ex. 11 | None | None | Drum-shaped magnetic sorter | 0.15 | None | Not performed |
| Ex. 12 | None | 8.0 | Drum-shaped magnetic sorter | 0.15 | From 0.6% through 6% relative to C | Not performed |
| Ex. 13 | None | 8.0 | Drum-shaped magnetic sorter | 0.15 | None | Performed |
| Ex. 14 | None | None | Drum-shaped magnetic sorter | 0.15 | From 0.6% through 6% relative to C | Performed |

TABLE 5-continued

| | Pulverizing step and magnetic sorting step after further thermal treatment | | | | | |
|---|---|---|---|---|---|---|
| | Fine pulverization (second pulverization) | | Wet magnetic sorting (second) | | | |
| | Pulverizer | D50 particle diameter of particles before wet magnetic sorting (μm) | Separator | Magnetic flux density (tesla) | Amount of dispersant | Particle dispersion treatment by ultrasonic waves |
| Ex. 15 | Vibrating mill | 6.1 | Drum-shaped magnetic sorter | 0.15 | From 0.6% through 6% relative to C | Performed |
| Ex. 16 | Vibrating mill | 7.3 | Drum-shaped magnetic sorter | 0.15 | From 0.6% through 6% relative to C | Performed |
| Ex. 17 | Vibrating mill | 6.9 | Drum-shaped magnetic sorter | 0.15 | From 0.6% through 6% relative to C | Performed |
| Ex. 18 | Vibrating mill | 6.8 | Drum-shaped magnetic sorter | 0.15 | From 0.6% through 6% relative to C | Performed |
| Ref. Ex. 1 | None | None | None | None | None | Not performed |
| Ref. Ex. 2 | None | None | None | None | None | Not performed |

(Study into Thermal Treatment Temperature)

Using a thermal gravity-differential thermal analyzer (obtained from Rigaku Corporation), it was confirmed whether cobalt and nickel metals would be produced at a battery pack thermal treatment temperature of from 750 °C through 1,200 °C.

Specifically, a mixture of carbon and a ternary system positive electrode material (containing cobalt, nickel, and manganese at a ratio by mole of 1:1:1) at a weight ratio of 3:7 was analyzed with the thermal gravity-differential thermal analyzer in a nitrogen atmosphere at a temperature elevation rate of 20 °C/minute.

Figure 9:
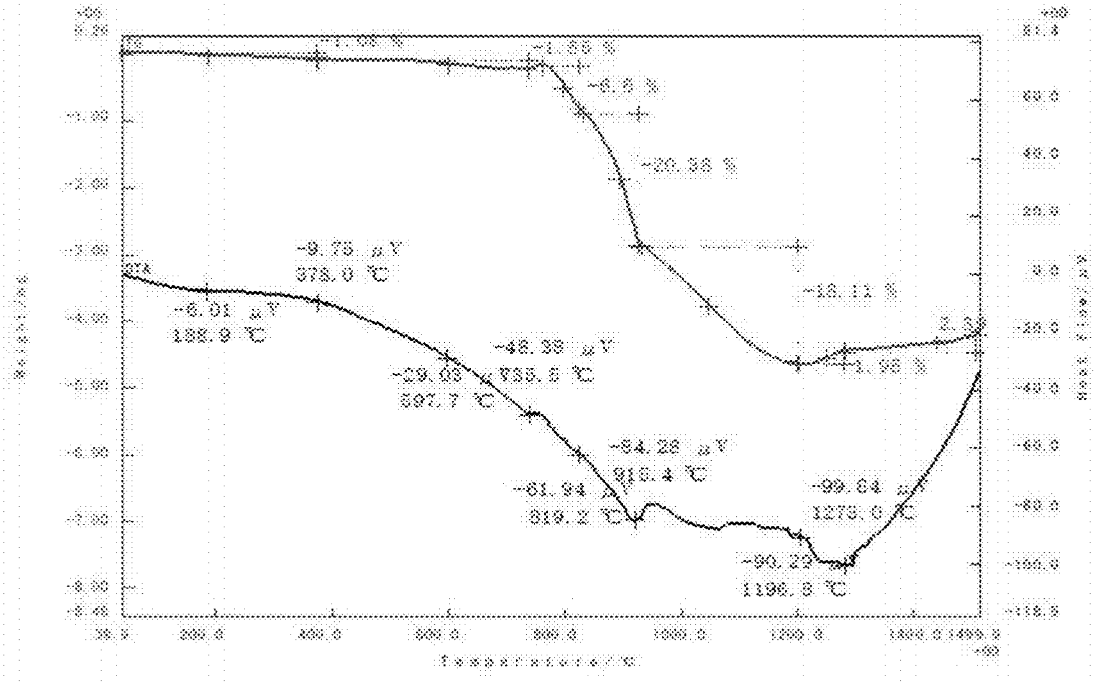
FIG. 9 is a graph plotting an example of a result of an analysis by a thermal gravity-differential thermal analyzer into a mixture of carbon and a ternary system positive electrode material at a weight ratio of 3:7 in order to study a thermal treatment temperature.

FIG. 9 plots the result of the analysis by the thermal gravity-differential thermal analyzer into the mixture of carbon and the ternary system positive electrode material at the weight ratio of 3:7 in order to study the thermal treatment temperature. In FIG. 7, the vertical axis represents change in the mass (Weight: TG curve) and temperature difference (Heat Flow: DTA curve), and the horizontal axis represents temperature.

It can be seen that an endothermic reaction started from around 400 °C and weight reduction occurred from around 750 °C in the example plotted in FIG. 9. Simultaneous occurrence of weight reduction and the endothermic reaction is characteristic to a reduction reaction. This suggests that the positive electrode material reagent, which was the analyzing target, was reduced by carbon. Reactions considered to have occurred in this example include the following reactions.

$$2LiMO_2+C\rightarrow Li_2O+2MO+CO$$

$$MO+C\rightarrow M+CO$$

(M represents a composite product of cobalt, nickel, and manganese, or an individual body of any of these.)

From this fact, it is considered preferable to perform the thermal treatment at 750 °C or higher in order to promote purification of cobalt and nickel as metals utilizing a reduction reaction by contact with carbon.

(Study into Further Thermal Treatment Temperature)

Next, the further thermal treatment temperature at which purification of cobalt and nickel as metals would occur was studied using the thermal gravity-differential thermal analyzer described above. In this study, a lithium ion secondary battery serving as a sample (target) was thermally treated, pulverized, and sieved (classified), to obtain an undersize fine-grained product, which was supplied to the thermal gravity-differential thermal analyzer. A reducing atmosphere by capping as in Examples described above was assumed as the atmosphere for this measurement. Hence, the measurement was performed in an air atmosphere, which would qualify as a state in which air was not completely absent, so oxygen was present around the sample even though oxygen would not be supplied actively, but a reducing atmosphere would exist by co-presence of carbon in the form of a powder. The temperature elevation rate was 20 °C/minute.

Figure 10:
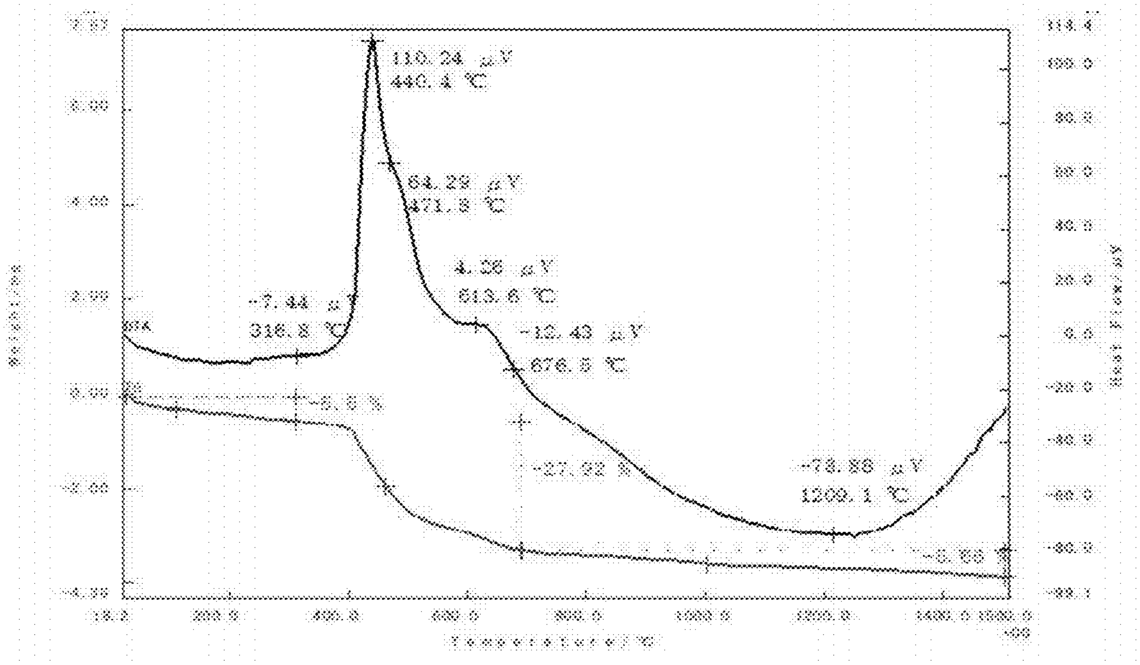
FIG. 10 is a graph plotting an example of a result of an analysis by a thermal gravity-differential thermal analyzer into a fine-grained product obtained by thermally treating, pulverizing, and classifying a lithium ion secondary battery in order to study a further thermal treatment temperature.

FIG. 10 plots the result of the analysis by the thermal gravity-differential thermal analyzer into a fine-grained product obtained by thermally treating, pulverizing, and classifying the lithium ion secondary battery in order to study the further thermal treatment temperature.

As plotted in FIG. 10, it was observed that weight reduction and an exothermic reaction occurred around above 300 °C, and carbon was combusted. Here, cobalt and nickel compounds were reduced by CO (carbon monoxide) generated along with the combustion, and purification reactions as metals proceeded. Reactions considered to have occurred in this example include the following reactions.

$$2C+O_2\rightarrow 2CO$$

$$MO+CO\rightarrow M+CO_2$$

(M represents a composite product of cobalt, nickel, and manganese, or an individual body of any of these.)

From this fact, it is considered preferable to perform the further thermal treatment at 300 °C or higher.

The invention claimed is:

1. A method for concentrating a valuable metal contained in a lithium ion secondary battery, the method consisting essentially of:

performing a thermal treatment of heating the lithium ion secondary battery or the positive electrode material thereof containing oxides containing manganese and at least one element selected from the group consisting of cobalt and nickel to a temperature in the range of from 600 °C to 1,200 °C to form a thermally treated product;

pulverizing the thermally treated product to form a pulverized product;

classifying the pulverized product in which a classification point is in the range of from 0.1 mm to 2.4 mm to form a fine-grained product; and performing a further thermal treatment in which the fine-grained product is heated to a temperature in the range of from 300 °C to 1,200 °C, to transform either or both of cobalt and nickel in the oxides into metals while maintaining manganese unchanged from the form of being in an oxidized state, and to form a granular aggregate containing the at least one valuable metal selected from the group consisting of cobalt and nickel; wherein in the thermal treatment of heating, the lithium ion secondary battery or the positive electrode material thereof is thermally treated in an inert atmosphere, and in the further thermal treatment, a cumulative 50% volume-based particle diameter D50 of the granular aggregate containing at least one metal selected from the group consisting of cobalt and nickel is 1 μm or greater and 10 μm or less.

2. The method for concentrating a valuable metal contained in a lithium ion secondary battery according to claim 1, wherein in the thermal treatment, the lithium ion secondary battery is contained in a case containing aluminum, and aluminum derived from the case is separated during the heating.

3. The method for concentrating a valuable metal contained in a lithium ion secondary battery according to claim 1, wherein in the pulverizing, a pulverization by an impact, shearing, or compression is performed.

4. The method for concentrating a valuable metal contained in a lithium ion secondary battery according to claim 1, wherein in the further thermal treatment, a reducing component is added to form a reducing atmosphere.

5. The method for concentrating a valuable metal contained in a lithium ion secondary battery according to claim 1, wherein in the further thermal treatment, the heating is performed in an air atmosphere or an oxidizing atmosphere for a part of a thermal treatment time, to decrease a grade of a reducing component in a further thermally treated product.

6. A method for concentrating a valuable metal contained in a lithium ion secondary battery, the method consisting essentially of:

performing a thermal treatment of heating the lithium ion secondary battery or the positive electrode material thereof containing oxides containing manganese and at least one element selected from the group consisting of cobalt and nickel to a temperature in the range of from 600 °C to 1,200 °C to form a thermally treated product;

pulverizing the thermally treated product to form a pulverized product;

classifying the pulverized product in which a classification point is in the range of from 0.1 mm to 2.4 mm to form a fine-grained product;

performing a further thermal treatment in which the fine-grained product is heated to a temperature in the range of from 300 °C to 1,200 °C, to transform either or both of cobalt and nickel in the oxides into metals while maintaining manganese unchanged from the form of being in an oxidized state, and to form a granular aggregate containing the at least one valuable metal selected from the group consisting of cobalt and nickel; and sorting and recovering a product in which either or both of cobalt and nickel are concentrated from the granular aggregate obtained in the further thermal treatment; wherein in the thermal treatment of heating, the lithium ion secondary battery or the positive electrode material thereof is thermally treated in an inert atmosphere, and in the further thermal treatment, a cumulative 50% volume-based particle diameter D50 of the granular aggregate containing at least one metal selected from the group consisting of cobalt and nickel is 1 μm or greater and 10 μm or less.

7. The method for concentrating a valuable metal contained in a lithium ion secondary battery according to claim 6, wherein in the sorting, the product in which either or both of cobalt and nickel are concentrated and a product in which manganese is concentrated are recovered.

8. The method for concentrating a valuable metal contained in a lithium ion secondary battery according to claim 6, wherein the sorting is magnetic sorting, and a magnetic flux density of a magnet in the magnetic sorting is 0.01 tesla or higher but 2 tesla or lower.

9. The method for concentrating a valuable metal contained in a lithium ion secondary battery according to claim 8, wherein the magnetic sorting is wet magnetic sorting, and a dispersant is added by 50 mg/L or greater to a slurry used in the wet magnetic sorting.

* * * * *